US007132027B2

(12) United States Patent
Jensen

(10) Patent No.: US 7,132,027 B2
(45) Date of Patent: Nov. 7, 2006

(54) COMPLEX COMPOSITE STRUCTURES AND METHOD AND APPARATUS FOR FABRICATING SAME FROM CONTINUOUS FIBERS

(75) Inventor: David W. Jensen, Mapleton, UT (US)

(73) Assignee: Brigham Young University, Provo, UT (US)

( * ) Notice: Subject to any disclaimer, the term of this patent is extended or adjusted under 35 U.S.C. 154(b) by 170 days.

(21) Appl. No.: 10/486,815

(22) PCT Filed: Aug. 16, 2002

(86) PCT No.: PCT/US02/26178

§ 371 (c)(1),
(2), (4) Date: Feb. 13, 2004

(87) PCT Pub. No.: WO03/016036

PCT Pub. Date: Feb. 27, 2003

(65) Prior Publication Data

US 2004/0247866 A1 Dec. 9, 2004

Related U.S. Application Data

(60) Provisional application No. 60/313,291, filed on Aug. 17, 2001.

(51) Int. Cl.
*B65H 81/00* (2006.01)
(52) U.S. Cl. .................. 156/175; 156/148; 156/169; 156/173; 87/1; 87/9; 87/13; 87/41
(58) Field of Classification Search .............. 156/169, 156/173, 175, 148, 149; 87/1, 9, 13, 41, 87/50
See application file for complete search history.

(56) References Cited

U.S. PATENT DOCUMENTS 31,777 A    3/1861  Boynton (Continued)

FOREIGN PATENT DOCUMENTS

FR    1377290    9/1964

(Continued)

OTHER PUBLICATIONS

Darooka et al, "Advanced Space Structure Concepts and Their Development", American Institute of Aeronautics and Astronautics, Structures, Structural Dynamics, and Materials Conference and Exhibit, 42nd Seattle Washington, Apr. 16-19, 2001, pp. 1-10.*
Fiber Innovations, Inc. Brochure.

(Continued)

*Primary Examiner*—Jeff H. Aftergut
(74) *Attorney, Agent, or Firm*—Thorpe North & Western

(57) ABSTRACT

A method and apparatus for fabricating a complex, three-dimensional structure (12), such as a truss, from composite fiber/resin includes pulling a plurality of continuous fibers (50) from a feed source (62) along a processing path (58) about a longitudinal axis (14). At least some of the fibers are wound around the longitudinal axis in opposite directions (70,72) by rotational elements to form helical and reverse helical components (30, 34) that intersect at nodes (26,28). Select nodes are engaged by engagement members (84) and are maintained radially outwardly from the longitudinal axis by a support frame (80) to create sequential discrete segments (22) in the helical and reverse helical components. The select nodes can be engaged and maintained from outside the helical and reverse helical components. Resin can be applied to the fibers by resin applicator (90) and cured. A three-dimensional structure (200) can be formed with one or more continuous fibers forming two or more different components (204, 206) of the structure and transitioning at transition nodes (207). A three-dimensional structure can be formed with the components including a sleeve (162) of braided fibers surrounding a core (163) of elongated fibers to reduce gaps.

32 Claims, 24 Drawing Sheets

U.S. PATENT DOCUMENTS

| | | | |
|---|---|---|---|
| 1,465,307 | A | 8/1923 | Keogan |
| 1,613,788 | A | 1/1927 | Dawson et al. |
| 1,798,064 | A | 3/1931 | Chorlton et al. |
| 1,922,269 | A | 8/1933 | Wickwire, Jr. |
| 3,062,336 | A | 11/1962 | Baxter |
| 3,496,687 | A | 2/1970 | Greenberg et al. |
| 3,501,880 | A | 3/1970 | Bosch |
| 3,705,473 | A | 12/1972 | Yeffal-rueda |
| 3,798,864 | A | 3/1974 | Georgii |
| 3,800,414 | A | 4/1974 | Shattes et al. |
| 3,970,116 | A | 7/1976 | Takada et al. |
| 4,077,828 | A | 3/1978 | Strom |
| 4,109,038 | A | 8/1978 | Hayashi et al. |
| 4,137,354 | A | 1/1979 | Mayes, Jr. et al. |
| 4,241,117 | A | 12/1980 | Figge |
| 4,253,284 | A | 3/1981 | Bliss |
| 4,260,143 | A * | 4/1981 | Kliger ................. 267/148 |
| 4,321,854 | A | 3/1982 | Foote et al. |
| 4,347,287 | A * | 8/1982 | Lewis et al. ............. 428/378 |
| 4,366,658 | A | 1/1983 | Maistre |
| 4,380,483 | A | 4/1983 | Kliger |
| 4,473,217 | A * | 9/1984 | Hashimoto ............. 267/149 |
| 4,475,323 | A | 10/1984 | Schwartzberg et al. |
| 4,494,436 | A | 1/1985 | Kruesi et al. |
| 4,686,134 | A | 8/1987 | Ono |
| 4,722,162 | A | 2/1988 | Wilensky |
| 4,734,146 | A | 3/1988 | Halcomb et al. |
| 4,786,341 | A | 11/1988 | Kobatake et al. |
| 4,803,824 | A | 2/1989 | Coppa |
| 4,916,997 | A | 4/1990 | Spain |
| 4,986,863 | A | 1/1991 | Denoel et al. |
| 5,003,736 | A | 4/1991 | Okazaki et al. |
| 5,016,516 | A | 5/1991 | Aldrich et al. |
| 5,048,441 | A | 9/1991 | Quigley |
| 5,152,326 | A | 10/1992 | Vöhringer |
| 5,197,254 | A | 3/1993 | Smith |
| 5,388,538 | A | 2/1995 | Chekroune et al. |
| 5,463,970 | A | 11/1995 | Hartlmeier et al. |
| 5,505,035 | A | 4/1996 | Lalvani |
| 5,556,677 | A | 9/1996 | Quigley et al. |
| 5,651,228 | A | 7/1997 | Zeigler |
| 5,921,048 | A | 7/1999 | Francom et al. |
| 5,962,150 | A | 10/1999 | Priluck |
| 6,076,324 | A | 6/2000 | Daily et al. |
| 6,264,684 | B1 | 7/2001 | Banas et al. |

FOREIGN PATENT DOCUMENTS

| | | |
|---|---|---|
| GB | 1251343 | 12/1971 |
| GB | 2049613 A * | 12/1980 |
| JP | 6215695 | 4/1987 |
| WO | WO 98-45556 | 10/1998 |
| WO | WO-02/10535 A2 * | 2/2002 |

OTHER PUBLICATIONS

Fiber Innovations, Inc. "Braided Composite Structures".
Debbie Stover, "Braiding and RTM Succeed in Aircraft Primary Structures", Advanced Composites May/Jun. 1989.
Ben K. Wada, et al. "Advances in Adapative Structures at Jet Propulsion Laboratory", Agard Conference Proceedings 531, Oct. 5-7, 1992.
Shigeto Shibuta, et al. "Adaptive Control of Space Truss Structures by Piezoelectric Actuator"; Second Joint Japan/U.S. Conference on Adaptive Structures; Nov. 12-14, 1991.
Peter C. Hughes, et al. "Trussarm"—A Variable-Geometry—Truss Manipulator; First Joint U.S./Japan Conference on Adaptive Structures; Nov. 13-15, 1990.
David W. Jensen, et al. "On the Structural Efficiency of Three-Dimensional Isogrid Designs"; 37$^{th}$ AIAA/ASME/ASCE/AHS/ASC Structures, Structural Dynamics, and Materials Conference; Apr. 15-17, 1996.
R.C. Hibbeler; "Space Trusses"; Engineering Mechanics Statics Seventh Edition.
Ferdinand P. Beer, et al. "Space Trusses"; Vector Mechanics for Engineers Statics Third Edition.
RC Hibbeler, "Space Trusses" Engineering Mechanics Statics, Chapter 6, Seventh Edition, pp. 267-270, Prentice-Hall, Englewood Cliffs, New Jersey.
Das, Alok et al., "Adaptive Structures for Spacecraft a USAF Perspective" AGARD Conference proceedings 531 Smart Structures for Aircraft and Spacecraft held in Germany, Oct. 1992 pp. 3-1 to 3-3-13.
Wada, Ben K. et al., "Advances in Adaptive Structures at Jet Propulsion Laboratory" AGARD Conference proceedings 531 Smart Structures for Aircraft and Spacecraft held in Germany, Oct. 1992, Applied Mechanics Technologies Section, pp. 28-1 to 28-13, Pasadena, California, USA.
Troidl H. et al., "Dynamic Tests on the NASA Langley CSI Evolutionary Model" AGARD Conference proceedings 531 Smart Structures for Aircraft and Spacecraft held in Germany, Oct. 1992, pp. 4-1 to 4-9.
Crawley, Edward et al., "Intelligent Structures a Technology Overview and Assessment": AGARD Conference proceedings 531 Smart Structures for Aircraft and Spacecraft held in Germany, Oct. 1992, Space Engineering Research Center, MIT, pp. 6-1 to 6-16, Cambridge, Massachusetts, USA.
Betti, F. et al., "On Possible Applications of Smart Structures to Control of Space Systems" AGARD Conference proceedings 531 Smart Structures for Aircraft and Spacecraft held in Germany, Oct. 1992, pp. 26-1 to 26-14.
Sirlin, S.W. et al., "Sizing of Active Piezoelectric Struts for Vibration Suppression on a Space-Based Interferometer" *Jet Propulsion Laboratory California Institute of Technology*, Pasadena, California pp. 47-63.
Mobrem, M. et al., "Control Design of Space Station Mobile Transporter with Multiple Constraints" *Astro Aerospace Corporation*, Carpentaria, California pp. 87-116 presented at the First Joint US/Japan Conference on Adaptive Structures Nov. 13-15, 1990.
Murotsu, Y. et al., "Optical Configuration Control of an Intelligent Truss Structure" *Department of Aeronautical Engineering, College of Engineering, University of Osaka Prefecture*, Sakai, Osaka Japan, pp. 157-175 presented at the First Joint US/ Japan Conference on Adaptive Structures Nov. 13-15, 1990.
Bronowicki, A.J. et al., "ACESA Structural Control System Design" *TRW Space and Technology Group*, Redondo Beach, California, pp. 373-401 presented at the First Joint US/ Japan Conference on Adapative Structures Nov. 13-15, 1990.
Seguchi, Y., "Criteria-Oriented Configuration Control of Adaptive Structure and its Modular Neural Network Representation" *Department of Mechanical Engineering*, Osaka University Toyonaka, Osaka Japan, pp. 402-421 presented at the First Joint US/ Japan Conference on Adaptive Structures Nov. 13-15, 1990.
Tanaka, M. et al., "On Damping Enhancement of LSS Coupled with the Antenna Pointing System" *Toshiba Corporation*, Kawasaki, Japan, pp. 510-524 presented at the First Joint US/ Japan Conference on Adaptive Structures Nov. 13-15, 1990.
Fanson, J.L. et al., "Damping and Structural Control of the JPL Phase 0 Testbed Structure" *Jet Propulsion Laboratory California Institute of Technology*, Pasadena, California pp.

510-524 presented at the First Joint US/ Japan Conference on Adaptive Structures Nov. 13-15, 1990.

Das, SK et al., "A Mathematical Basis for the Design and Design Optimization of Adaptive Trusses in Precision Control" *Duke University*, Durham North Carolina, pp. 660-690 presented at the First Joint US/ Japan Conference on Adaptive Structures Nov. 13-15, 1990.

Tanaka, M. et al., Kinematics of Adapative Truss Permitting Modal Offset (configuration and workspace reach), *Osaka university, Department of Mechanical engineering*, Osaka, Japan, pp. 691-714, presented at the First Joint US/ Japan Conference on Adaptive Structures Nov. 13-15, 1990.

Hughes, P.C., "Trussarm—A Variable-Geometry-Truss Manipulator"*University of Toronto, Institute for Aerospace Studies*, Toronto, Canada, pp. 715-725 presented at the First Joint US/ Japan Conference on Adaptive Structures Nov. 13-15, 1990.

Chen, G.S. et at., "On an Adaptive Truss Manipulator Space Crane Concept" *Jet Propulsion Laboratory, California Institute of Technology*, Pasadena, California, pp. 726-742, presented at the First Joint US/ Japan Conference on Adaptive Structures Nov. 13-15, 1990.

Murotsu, Y. et al., "Some Approaches to the Optimal Adaptive Geometries of Intelligent Truss Structures" *University of Osaka Prefectures*, Sakai, Osaka, Japan, pp. 743-771, presented at the First Joint US/ Japan Conference on Adaptive Structures Nov. 13-15, 1990.

Tidwell, PH et al., "Kinematic Analysis of Generalized Adaptive Trusses" *Mechanical Engineering Department, Virginia Polytechnic Institute and State University*, Blacksburg, Virginia, pp. 772-791 presented at the First Joint US/ Japan Conference on Adaptive Structures Nov. 13-15, 1990.

Matsuzaki, Y. et al., "Application of Fuzzy Control to Tracking for Docking Operation of An Adaptive Space Structure" *Department of Aerospace Engineering, Nagoya university*, Chikusa, Nagoya Japan, pp. 792-806 presented at the First Joint US/ Japan Conference on Adaptive Structures Nov. 13-15, 1990.

Jensen, D. W. et al., "Dynamic Characterization of a Composite Lattice Structure with an Integrated Fiber-Optic Strain Sensor" *The Pennsylvania State University, Department of Aerospace Engineering*, University Park, Pennsylvania, pp. 828-845, presented at the First Joint US/ Japan Conference on Adaptive Structures Nov. 13-15, 1990.

Allen, J. J. et al., "The Sandia Structural Control Experiments" *Sandia National Laboratories*, Albuquerque, New Mexico, pp. 928-951 presented at the First Joint US/ Japan Conference on Adaptive Structures Nov. 13-15, 1990.

Swanson, A. D. et al., "Zero-Gravity Dynamics of Space Structures in Parabolic Aircraft Flight"*flight dynamics laboratory, air force Wright research and development center ,Wright-Patterson Air Force Base*, Ohio, pp. 952-965 presented at the First Joint US/ Japan Conference on Adaptive Structures Nov. 13-15, 1990.

Lawrence, C.R. et al., "Active Member Vibration Control Experiment in a KC-135 Reduced Gravity Environment" *Jet Propulsion Laboratory, California Institute of Technology*, Pasadena, California, pp. 987-1003 presented at the First Joint US/ Japan Conference on Adaptive Structures Nov. 13-15, 1990.

Maclean, B.J. et al., "Development of a Shape Memory Material Actuator for Adaptive Truss Applications" *Materials and Structures Group Research & Technology, Martin Marietta Space Systems* Denver, Colorado, pp. 1038-1055 presented at the First Joint US/ Japan Conference on Adaptive Structures Nov. 13-15, 1990.

Kuo, C.P. et al., "Optimal Acutator Placement on an Active Reflector Using a Modified Simulated Annealing Technique" *Applied Mechanics Technologies Section, Jet Propulsion Laboratory, California Institute of Technology*, Pasadena, California, pp. 1056-1068 presented at the First Joint US/ Japan Conference on Adaptive Structures Nov. 13-15, 1990.

Miura, K. et al., "Aerospace Research Status on Adaptive Structures in Japan" *Institute of Space and Astronautical Sciences*, Yoshinodai, Sagamihara, Japan, pp. 3-14, presented at the Second Joint US/ Japan Conference on Adaptive Structures Nov. 12-14, 1991.

Anderson, W.W. et al., The NASA-LaRC Controls-Structure Interaction Technology Program *Guidance and Control Division, NASA*, Hampton, Virginia, pp. 15-31, presented at the Second Joint US/ Japan Conference on Adaptive Structures Nov. 12-14, 1991.

Breitbach, E. J., "Research Status on Adaptive Structures in Europe" *Institute of Aeroelasticity*, Goettingen, Germany, pp. 32-48, presented at the Second Joint US/ Japan Conference on Adaptive Structures Nov. 12-14, 1991.

Yosida, K et al., "COSMO-LAB Concept: A Cooperation of Space Robots and Structures" *Department of Mechanical Engineering Science, Tokyo Institute of Technology*, Tokyo, Japan, pp. 59-76, presented at the Second Joint US/ Japan Conference on Adaptive Structures Nov. 12-14, 1991.

Natori, M.C. et al., "Application of Adaptive Structure Concepts to Construction of space Systems in Orbit—Concepts and Formulation" *Institute of Space and Astronautical Science* Sagamihara, Japan pp. 77-91, presented at the Second Joint US/ Japan Conference on Adaptive Structures Nov. 12-14, 1991.

Modi, V.J. et al., "Formulation for a Class of Adaptive Structures with Applications" *Department of Mechanical Engineering, The University of British Columbia*, Vancouver, British Columbia, Canada, pp. 92-110, presented at the Second Joint US/ Japan Conference on Adaptive Structures Nov. 12-14, 1991.

Wada, B. K. et al., "Application of Adaptive Structures for the Control of Truss Structures" *Jet Propulsion Laboratory, California Institute of Technology* Pasadena, California, pp. 123-131, presented at the Second Joint US/ Japan Conference on Adaptive Structures Nov. 12-14, 1991.

Larson, L. B. et al., "An Experimental 10-Meter Space Truss with Tendon Control" *School of Civil and Environmental Engineering, Cornell University* Ithaca, New York, pp. 227-244, presented at the Second Joint US/ Japan Conference on Adaptive Structures Nov. 12-14, 1991.

Shibuta, S. et al., "Adaptive Control of Space Truss Structures by Piezoelectric Actuator" *National Space Development Agency of Japan Tsukuba Space Center*, Ibaraki, Japan, pp. 245-262, presented at the Second Joint US/ Japan Conference on Adaptive Structures Nov. 12-14, 1991.

Kuwao, F. et al., "Quasi-Static Shape Estimation and Control of Adaptive Truss Structures Using Internal Displacement Structures" *Applied mechanics Technologies Section, Jet Propulsion laboratory, California Institute of Technology*, Pasadena, California, pp. 375-392, presented at the Second Joint US/ Japan Conference on Adaptive Structures Nov. 12-14, 1991.

Tabata, M. et al., "Shape Adjustment of a Flexible space Antenna Reflector": *Mitsubishi Electric Corporation, Center Research Laboratory*, Hyogo, Japan, pp. 393-405, presented at the Second Joint US/ Japan Conference on Adaptive Structures Nov. 12-14, 1991.

Tanaka, M. et al., "Stochastic Approach to Static Control of Adaptive Truss under Imperfection of Adjustable Member Lengths" *Department of Mechanical Engineering, Osaka University*, Osaka, Japan, pp. 406-418, presented at the Second Joint US/ Japan Conference on Adaptive Structures Nov. 12-14, 1991.

Pai, S.S. et al., "Probabilistic Structural Analysis of Adaptive/Smart/ Intelligent Space Structures" *National Aeronautics and Space Administration, Lewis Research Center*, Cleveland, Ohio, pp. 419-433, presented at the Second Joint US/ Japan Conference on Adaptive Structures Nov. 12-14, 1991.

Sirlin, S. W. et al., "Active Structural Control for Damping Augmentation and Compensation of Thermal Distortion" *Jet Propulsion Laboratory, California Insititute of Technology*, Pasadena, California, pp. 434-444, presented at the Second Joint US/ Japan Conference on Adaptive Structures Nov. 12-14, 1991.

Fisher, S., "Real-Time Modifications of an Orbiting Spacecraft to Excite Vibrations Observed by a Ground-Based Laser Radar" *Naval Research Laboratory*, Washington, D.C., pp. 479-492, presented at the Second Joint US/ Japan Conference on Adaptive Structures Nov. 12-14, 1991.

Naccarato, F. et al., "Redundancy Resolution in Variable-Geometry Truss Manipulators Using Reference Shape Curves" *Institute for Aerospace Studies, University of Toronto*, Downsview, Ontario, Canada, pp. 539-555, presented at the Second Joint US/ Japan Conference on Adaptive Structures Nov. 12-14, 1991.

Yokoi, K et al., "A Method for Solving Inverse Kinematics of Variable Structure Truss Arm with High Redundancy" *Robotics Department, Mechanical Engineering Laboratory*, Tsukuba, Ibaraki, Japan, pp. 606-620, presented at the Second Joint US/ Japan Conference on Adaptive Structures Nov. 12-14, 1991.

D'Eleuterio, G. M. T., "Articulational Dynamics of Variable-Geometry Truss Structures" *Institute for Aerospace Studies, University of Toronto*, Downsview, Ontario, Canada, pp. 621-640, presented at the Second Joint US/ Japan Conference on Adaptive Structures Nov. 12-14, 1991.

Matsuzaki, Y. et al., "Application of Fuzzy Control to Computer Simulation of Tracking and Rendezvous Test for Docking of an Adaptive Space Structure" *Department of Aerospace Engineering, Nagoya University*, Chikusa, Nagoya, Japan, pp. 641-652, presented at the Second Joint US/ Japan Conference on Adaptive Structures Nov. 12-14, 1991.

Mutotsu, Y. et al., "PD-Impedance Control of Docking Mechanism Composed of Intelligent Adaptive Structure" *Department of Aeronautical Engineering, College of Engineering, University of Osaka Prefecture*, Sakai, Osaka, Japan, pp. 653-669, presented at the Second Joint US/ Japan Conference on Adaptive Structures Nov. 12-14, 1991.

Jensen, W. D. et al., "Validation of Active Strain Measurements in Composites Using Mach-Zehnder Interferometry with Embedded Optical Fibers" *The Pennsylvania State University, Department of Aerospace Engineering*, University Park, Pennsylvania, pp. 771-788, presented at the Second Joint US/ Japan Conference on Adaptive Structures Nov. 12-14, 1991.

* cited by examiner

COMPLEX COMPOSITE STRUCTURES AND METHOD AND APPARATUS FOR FABRICATING SAME FROM CONTINUOUS FIBERS

This application claims the benefit of U.S. provisional patent application No. 60/313,291 filed Aug. 17, 2001.

BACKGROUND OF THE INVENTION

1. Field of the Invention

The present invention relates generally to complex, composite structures and an apparatus and method for fabricating such complex structures from composite fiber/resin. More particularly, the present invention relates to an apparatus and method for fabricating complex structures with a plurality of helical and/or reverse helical components, such as trusses or cylinders.

2. Related Art

Complex truss structures have been described in U.S. Pat. No. 5,921,048 that can have enhanced load bearing capacity per unit weight. Such structures can have complex configurations, including for example, a plurality of helical components formed around a longitudinal axis in opposite directions. Each helical component can include a plurality of sequential straight segments coupled end-to-end in a helical configuration. Each helical component can include three segments forming a single, complete rotation about the axis, such that the helical component has a triangular cross-sectional shape formed by the straight segments when viewed along the axis.

The plurality of helical components can include both 1) spaced-apart helical components formed around the axis in one direction or with one angular orientation, and 2) spaced-apart reverse helical components formed around the axis in another direction or with an opposing angular orientation. The straight segments of the helical and reverse helical components can form a triangular cross-sectional shape when viewed along the axis. In addition, the helical components further can include 3) spaced-apart rotated helical components, and 4) spaced-apart rotated reverse helical components, that are similar to the respective helical and reverse helical components, but rotated about the axis with respect to the helical and reverse helical components. Thus, the helical and reverse helical components form a first triangular shape, while the rotated helical and rotated reverse helical components form a second triangular shape concentric with, but rotated with respect to, the first triangular shape, to form a six-pointed star shape.

The various helical components form a basic repeating pattern along the length of the structure. In addition, the various helical components intersect one another at internal and external nodes, with the external nodes being spaced further from the axis than the internal nodes. For example, the helical and reverse helical components intersect at internal and external nodes. The structure further can include axial components that extend along the length of the structure parallel with the axis. Such axial components can intersect the helical components, including for example, at the internal and/or external nodes.

It is desirable to form such structure from composite materials to reduce weight and increase strength. In addition, it is desirable to form the helical and axial components from continuous fibers to further maximize the strength of the structure. Thus, the fibers are traversing along the structure at various angles. As stated above, such structures have shown unexpected stiffness, and strength or load bearing capacity per unit weight.

The fabrication of such structures, however, has proven to be very difficult. Wide-spread application of such structures has been frustrated by the inability to quickly, easily, and/or inexpensively manufacture such structure. It will be appreciated that such structures have complex geometries or configurations. It also will be appreciated that such complex geometries have proven ill suited for conventional manufacturing techniques.

Various manufacturing processes exist for composite fiber/resin. For example, in a pultrusion process, the fiber and resin is extruded and pulled through a die having the desired, continuous, cross-sectional shape. As another example, braiding processes overlap fibers into a sock or sleeve configuration in a continuous, closed layer. Such sleeves can be formed or disposed over a mandrel or around a die. As another example, mandrel techniques wind fiber about a solid model or mandrel with a continuous, solid outer surface having the desired configuration about which the fibers are disposed. After the fiber has been impregnated with resin, and the resin cured to form a rigid structure about the mandrel, the mandrel can be removed to leave the rigid structure.

None of these existing technologies appears suited for continuous or volume manufacturing of such complex, three-dimensional structures described above. For example, it will be appreciated that the complex, three-dimensional nature of the structure, with the straight segments extending through the structure between external nodes, makes any mandrel shaped as the structure difficult to remove from the structure itself. Similarly, it will be appreciated that the complex, three-dimensional structure has a varying cross-sectional shape, and discontinuous or open surface structure, which is ill-suited for conventional pultrusion techniques. As another example, it is unclear, how braiding techniques could be used to fabricate more complex and open structures, such as those described above.

In addition, the intersections of the various helical components at the nodes have also proven problematic. It will be appreciated that as the various fibers intersect, gaps can be formed between the fibers which can reduce the strength of the structure by as much as 90 percent.

SUMMARY OF THEE INVENTION

It has been recognized that it would be advantageous to develop an apparatus and/or method for fabricating complex structures, such as those with complex helical configurations. In addition, it has been recognized that it would be advantageous to develop such structures to prevent or resist the formation of gaps between overlapping fibers.

The invention provides complex, composite three-dimensional structures and a method and apparatus for fabricating the complex, composite structures from continuous fibers. Such structures can include helical and reverse helical components that wrap around a longitudinal axis in opposite directions and intersect one another at nodes. The helical and reverse helical components can be formed of sequential discrete segments. Additional longitudinal members can extend parallel to the longitudinal axis and intersect the nodes.

The method includes pulling a plurality of continuous fibers from a feed source along a processing path about a longitudinal axis. At least some of the fibers are wound around the longitudinal axis in opposite directions to form helical and reverse helical components that intersect at nodes. The fibers are engaged in the processing path substantially only at locations localized at select nodes without substantially engaging the helical and reverse helical components. The select nodes are maintained radially outwardly from the longitudinal axis to create sequential discrete segments in the helical and reverse helical components. Resin is applied to the fibers, and cured.

In accordance with a more detailed aspect of the present invention, the method can further include engaging the select nodes from outside the helical and reverse helical components. The select nodes can be maintained radially outwardly by a force originating from outside the helical and reverse helical components. Thus, the structure can be formed without a traditional internal mandrel.

In accordance with another more detailed aspect of the present invention, the method can further include arranging a plurality of continuous fibers to form a plurality of elongated strands in a predetermined orientation including at least two different strands with different orientations that intersect one another at the nodes. The plurality of fibers can be overlapped and consolidated at the nodes. The fibers can be compacted at the nodes to reduce gaps. The fibers can be consolidated by twisting the strands. In addition, the fibers can be consolidated by wrapping other fibers around the strands to form a core of substantially unidirectional fibers wrapped with a layer of outer fibers. In addition, the strands can be consolidated by braiding at least one of the strands. Furthermore, the strands can be consolidated by braiding other fibers around the strands to form a core of substantially unidirectional fibers wrapped with a layer of outer braided fibers.

An apparatus or machine for fabricating the structures includes a plurality of fiber feed sources to supply a plurality of continuous fibers and a puller to pull the continuous fibers from the fiber feed sources and through a processing path with a longitudinal axis. A plurality of rotational elements are associated with the fiber feed sources and rotatable with respect to the processing path in opposite directions around the longitudinal axis to wind the continuous fibers in opposite directions to form helical and reverse helical components which intersect at nodes. A support frame is disposed along the processing path and includes a plurality of engagement members to engage the helical and reverse helical components path substantially only at locations localized at the nodes in the processing path, and to maintain the nodes of the helical and reverse helical components radially outwardly from the longitudinal axis to form sequential discrete segments in the helical and reverse helical components. A resin applicator applies resin to the continuous fibers.

In accordance with a more detailed aspect of the present invention, the support frame can be an external support frame disposed outside the helical and reverse helical components. The plurality of engagement members can be disposed around the processing path to engage the nodes from outside the helical and reverse helical components. Thus, the structure can be formed without a traditional internal mandrel.

As stated above, a three-dimensional structure can include a plurality of spaced-apart, helical components, each having a common angular orientation and sequential discrete segments wrapping around the longitudinal axis in one direction. The structure also can include a plurality of spaced-apart, reverse helical components, each having an opposite angular orientation with respect to the helical components, and sequential discrete segments wrapping around the longitudinal axis in an opposite direction. The helical and reverse helical components intersect at nodes. Furthermore, a plurality of longitudinal members can intersect the helical and reverse helical components at the nodes, and can be oriented substantially parallel with the longitudinal axis. The helical and reverse helical components and the longitudinal members are formed from a plurality of continuous fibers.

In accordance with a more detailed aspect of the present invention, at least some of the fibers can form at least portions of at least two members from the group of the helical components, the reverse helical components, and the longitudinal members. Such fibers transition at the nodes.

In accordance with another more detailed aspect of the present invention, at least some of the plurality of continuous fibers can include a core of elongated fibers and a sleeve of braided fibers surrounding the core of elongated fibers.

Additional features and advantages of the invention will be apparent from the detailed description which follows, taken in conjunction with the accompanying drawings, which together illustrate, by way of example, features of the invention.

BRIEF DESCRIPTION OF THE DRAWINGS

FIG. 4b is an end view of the exemplary structure of FIG. 4a;

FIG. 16b is a top view of the rectangular structure of FIG. 16a;

FIG. 16c is a side view of the rectangular structure of FIG. 16a;

FIG. 16d is an end view of the rectangular structure of FIG. 16a;

DETAILED DESCRIPTION

Figure 1:
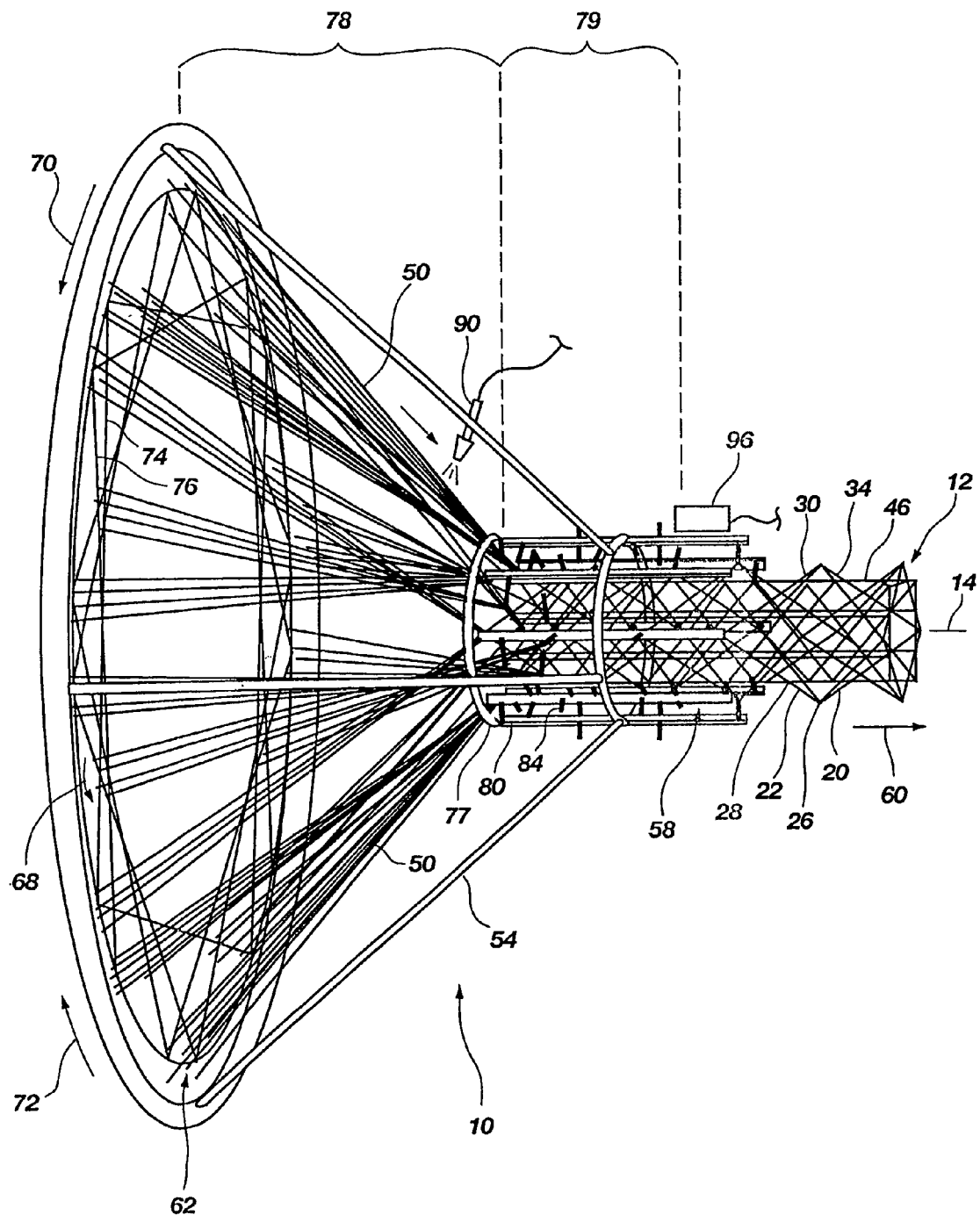
FIG. 1 is a perspective view of an apparatus for fabricating complex, composite structures in accordance with an embodiment of the present invention.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

The present invention introduces a unique methodology referred to as tensioned fiber placement or casting, which has demonstrated surprising utility for fabricating or casting complex, composite fiber/resin structures in free-space. The method involves interlacing one or more rotating strands of transverse fibers with an array of tensioned, longitudinal fibers to form a support skeleton suitable for further interlacing or over-wrapping of other fiber strands at varying orientations. These collective, interwoven, fibers are coated with resin and cured in this tensioned, skeletal configuration to form a sturdy structure with very high load capacity and stiffness, but very low weight. The open nature of the structure not only provides for minimal weight, but also is well suited for numerous and diverse structural applications. The skeletal or grid structure also may be covered with additional structure or a non-structural skin.

The subject, tensioned fiber placement or casting method is implemented with an apparatus 10, illustrated in FIGS. 1–3b, for fabricating complex, three-dimensional, composite structures. Three-dimensional truss structures are a specific example of a field that may benefit from use of such an apparatus and method. For example, the apparatus 10 and method can be utilized to fabricate the three-dimensional truss structures as disclosed in U.S. Pat. No. 5,921,048, which is herein incorporated by reference, and similar or related structures. For illustrational purposes, the apparatus 10 and method shall be described herein with respect to fabricating an "eight-node" structure 12, as described below and illustrated in FIGS. 4a and 4b. It is of course understood that the apparatus 10 and method of the present invention can be utilized to fabricate other structures, including for example, six or twelve-node structures (as described in U.S. Pat. No. 5,921,048), other n-node structures, etc.

Figure 4A:
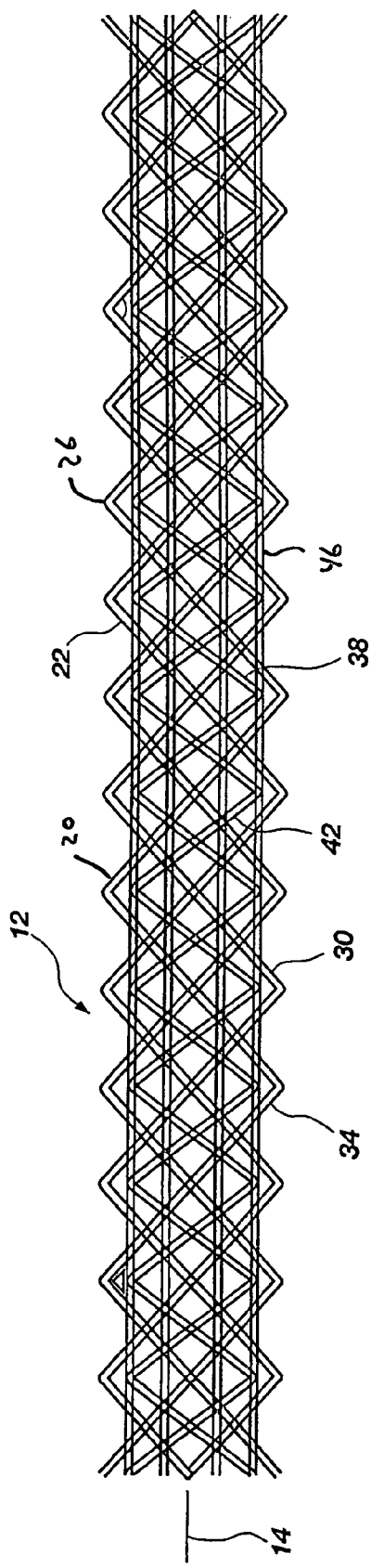
FIG. 4a is a side view of an exemplary structure to be fabricated with the apparatus of FIG. 1.
Figure 4C:
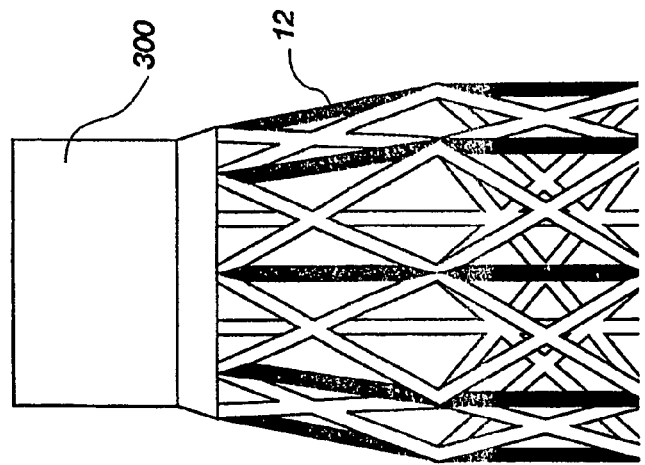
FIG. 4c is a side view of an end of an exemplary structure of FIG. 4a with an integral transition to a circular cross-section.
Figure 4B:
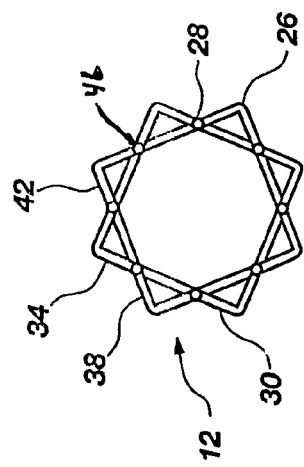

Referring to FIGS. 4a and 4b, the eight-node structure 12, as well as other n-node structures, can be characterized by a plurality of elements or members arranged in a repeating pattern along the length or longitudinal axis 14 of the structure 12. The structure 12 can be conceptualized and described as a plurality of helical components 20 wrapped or wound about the longitudinal axis 14 and forming a helix wrapping around the axis. Each helical component 20 is formed by a plurality of sequential discrete segments 22 coupled end-to-end in a helical configuration. Each of the discrete segments 22 can be straight and oriented at an angle with respect to adjacent segments. Thus, each helix or helical component can be formed by sequential straight segments. In one aspect, three or more of the straight segments 22 form a single, substantial complete rotation about the axis 14 creating a polygonal cross-sectional shape when viewed along the axis 14. For example, three segments forming a single complete rotation form a triangle; four segments forming a single complete rotation form a square (as shown) or rectangle; etc. A plurality of helical components or helixes can be spaced-apart along the axis, so that the helical components or helixes are concentric, and intermesh. The various helical components intersect at external nodes 26 and internal nodes 28, as described below.

In one aspect, the components 20 include: 1) a plurality of spaced-apart, helical components 30, and 2) a plurality of spaced-apart, reverse helical components 34 attached to the helical components. The helical and reverse helical components 30 and 34 have a common longitudinal axis, but opposing angular orientations about the axis. Thus, the helical components 30 wrap around the axis in one direction, while the reverse helical components 32 wrap around the axis in the other direction. As stated above, the helical and reverse helical components 30 and 34 can intersect one another at internal and external nodes 28 and 26. The straight segments 22 of the helical and reverse helical components 30 and 34 together form a first cross-sectional shape when viewed along the axis. For example, as described above; three segments form a triangle; four segments form a square (as shown) or rectangle; etc.

In addition, the components 20 can further include: 3) spaced-apart, rotated helical components 38, and 4) spaced-apart, rotated reverse helical components 42, both of which are similar to, but rotated with respect to, the respective helical and reverse helical components 30 and 34. Similar to the helical and reverse helical components described above, the rotated helical and rotated reverse helical components 38 and 42 can wrap around the axis in opposite directions. The straight segments 22 of the rotated helical and rotated reverse helical components 38 and 42 form a second cross-sectional shape that is rotated with respect to the first cross-sectional shape. The segments of the rotated and rotated reverse helical components, and thus the second cross-sectional shape, are rotated about the axis with respect to the helical and reverse helical components, and thus the first cross-sectional shape.

In one aspect, all of the helical components 20 include at least three, sequential straight segments 22 that form a single, substantially complete rotation about the axis. For example, the helical components 20 can include four, sequential straight segments 22 that form a single, substantially complete rotation about the axis 14, as shown. Thus, the four straight segments 22 in each of the helical and reverse helical components 30 and 34 form a first, square cross-sectional shape. Similarly, the four straight segments of the rotated helical and rotated reverse helical components 38 and 42 form a second, square cross-sectional shape, that can be concentric with, but rotated with respect to the first cross-sectional shape, to create an eight-pointed star (as shown in FIG. 4b). The structure 12 thus has eight external nodes 26.

In one aspect, the number of helical components 20 in each of the helical, reverse helical, rotated helical, and rotated reverse helical components 30, 34, 38 and 42 is the same as the number of straight segments in each component. Thus, the components 20 can include four helical components 30, four reverse helical components 34, four rotated helical components 38, and four rotated reverse helical components 42, for a total of sixteen helical components. As stated above, the four components in each of the helical, reverse helical, rotated helical, and rotated reverse helical components are spaced-apart from one another so that the structure has an open configuration with spaces between the components.

In addition, straight or axial components may extend longitudinally, and intersect the internal and/or external nodes 28 and 26. For example, the structure 12 can include eight straight or axial internal components 46 intersecting the eight internal nodes 28, as shown in FIGS. 4a and 4b. Therefore, the structure 12 as shown includes twenty-four components. In addition, or alternatively, a structure can include eight straight or axial external components 47 intersecting the eight external nodes 26, as shown in FIGS. 4e and 4f. The components can be formed of a composite fiber/resin with continuous fibers extending along the length of the components. The resulting structure has been found to exhibit enhanced stiffness and load bearing capacity per unit weight.

It will be appreciated from an examination of the resulting structure, however, that the complex configuration is difficult to manufacture. For example, the straight segments extend between external nodes 26, which are at a greater distance from the axis 14, and pass through the structure at internal nodes 28, which are at a lesser distance from the axis. The straight segments further add to the complexity of the structure because they laterally traverse the truss structure surrounding an open, central core at various angles. The segments of one cross-sectional shape traverse the other cross-sectional shape. Thus, the structure is difficult to easily, quickly, and cost effectively manufacture with conventional mandrel techniques.

Referring again to FIGS. 1–3b, the apparatus or machine 10 is shown for fabricating complex, composite structures, such as the truss structures described above, from continuous fibers or tows 50 or strands of fibers. As stated above, the apparatus 10 as shown is configured for fabricating the three-dimensional, eight-node truss structure 12 described above. It is of course understood that the apparatus 10 can be configured to fabricate other such complex structures having different configurations.

The apparatus 10 can include a frame or base support member 54 with a processing path 58 along which the continuous fibers 50 are arranged into the complex structure 12. The processing path 58 can have a longitudinal axis that is concentric with the longitudinal axis 14 of the structure 12. The continuous fibers 50, and resulting structure 12, are drawn through the processing path 58 of the apparatus 10, as indicated by arrow 60. As discussed in greater detail below, a puller can pull the continuous fibers 50 and/or structure 12 through the processing path 58 and maintain the fibers 50 in a taut condition. The fibers 50 are disposed in the processing path 58, and pulled taut, to provide an axial support configuration which forms an operating skeleton for assembly of the structure 12. This skeletal structure enables formation of complex open structures without dependence upon a traditional internal mandrel, die, or other internal shaping device configured to support the entire surface of an object. Again, it will be appreciated that such a traditional internal mandrel configured to support all such internal surfaces of such a complex three-dimensional structure would be difficult to remove from the structure.

A plurality of fiber feed sources 62 can be associated with or coupled to the frame or base support member 54 to provide the continuous fibers 50. Thus, the continuous fibers 50 can be drawn from the fiber feed sources 62 and through the apparatus 10 or processing path 58. The fiber feed sources 62 can include center feed coils or outer feed spools about which the continuous fibers 50 are wound. Any fiber source that facilitates continuous release of a tensioned fiber can be utilized in this apparatus.

Figure 2A:
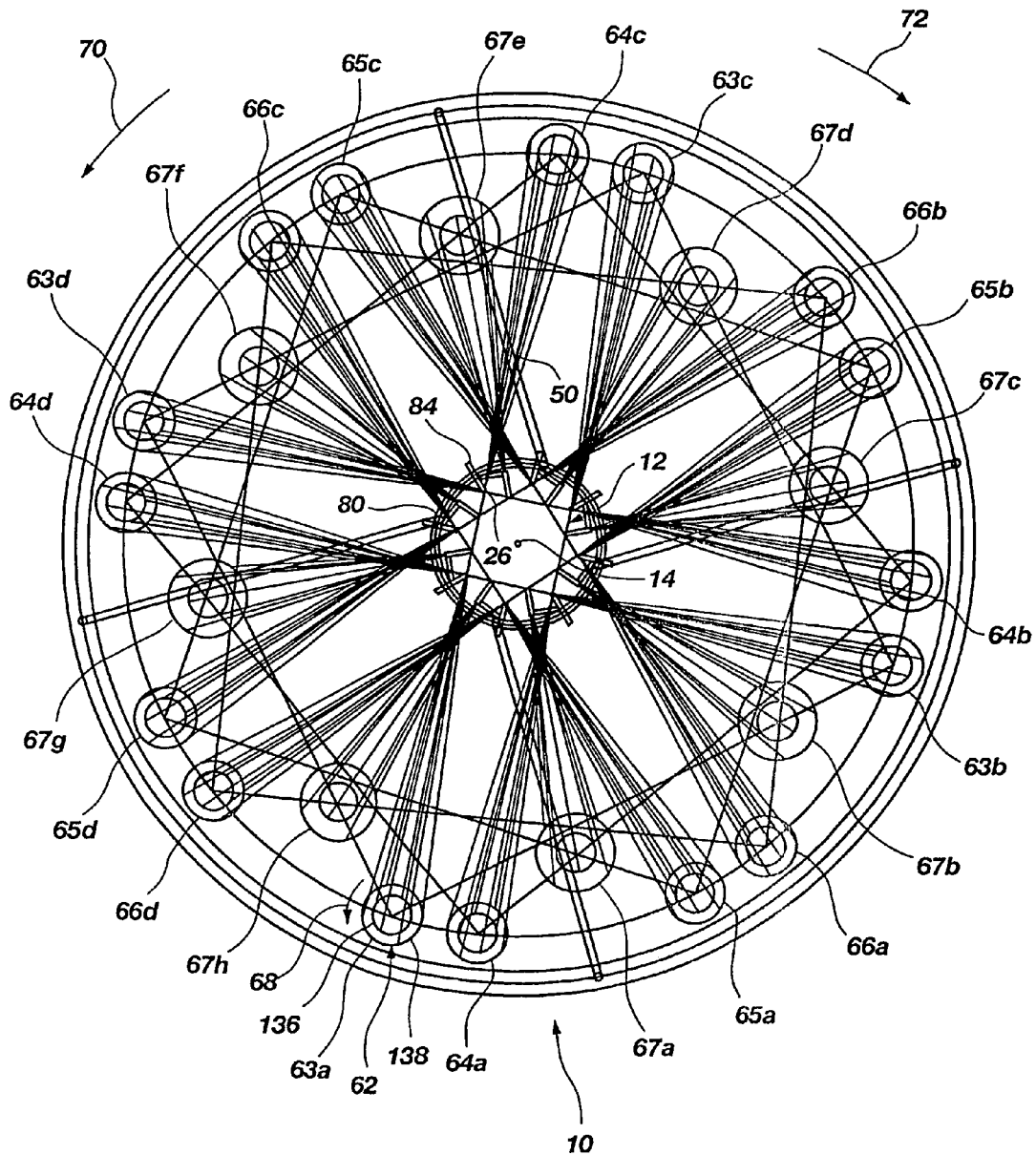
FIG. 2a is an end view of the apparatus of FIG. 1.
Figure 2B:
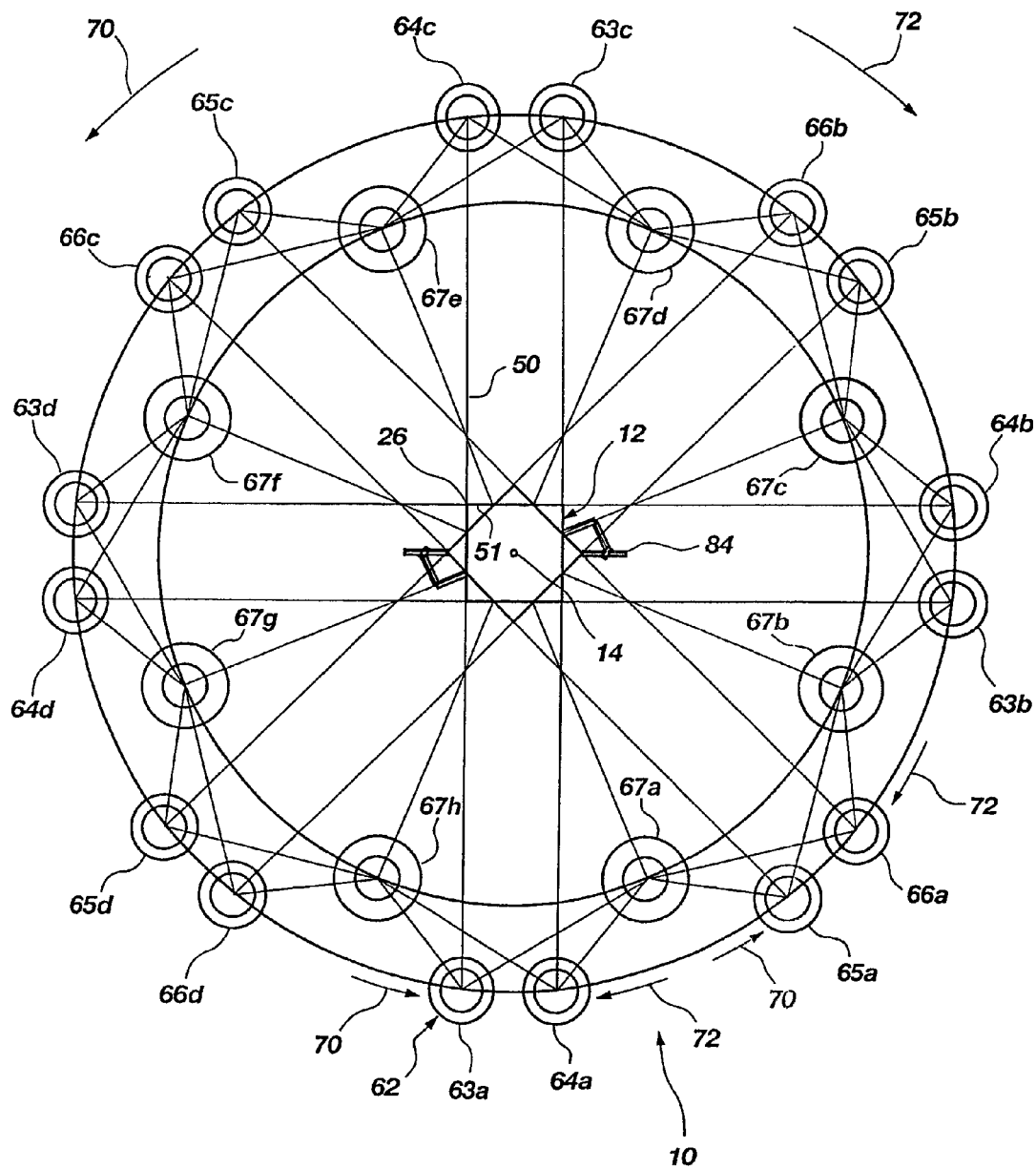
FIG. 2b is an end view of the apparatus of FIG. 1 with groups of fibers reduced to a single representative fiber for clarity.
Figure 3A:
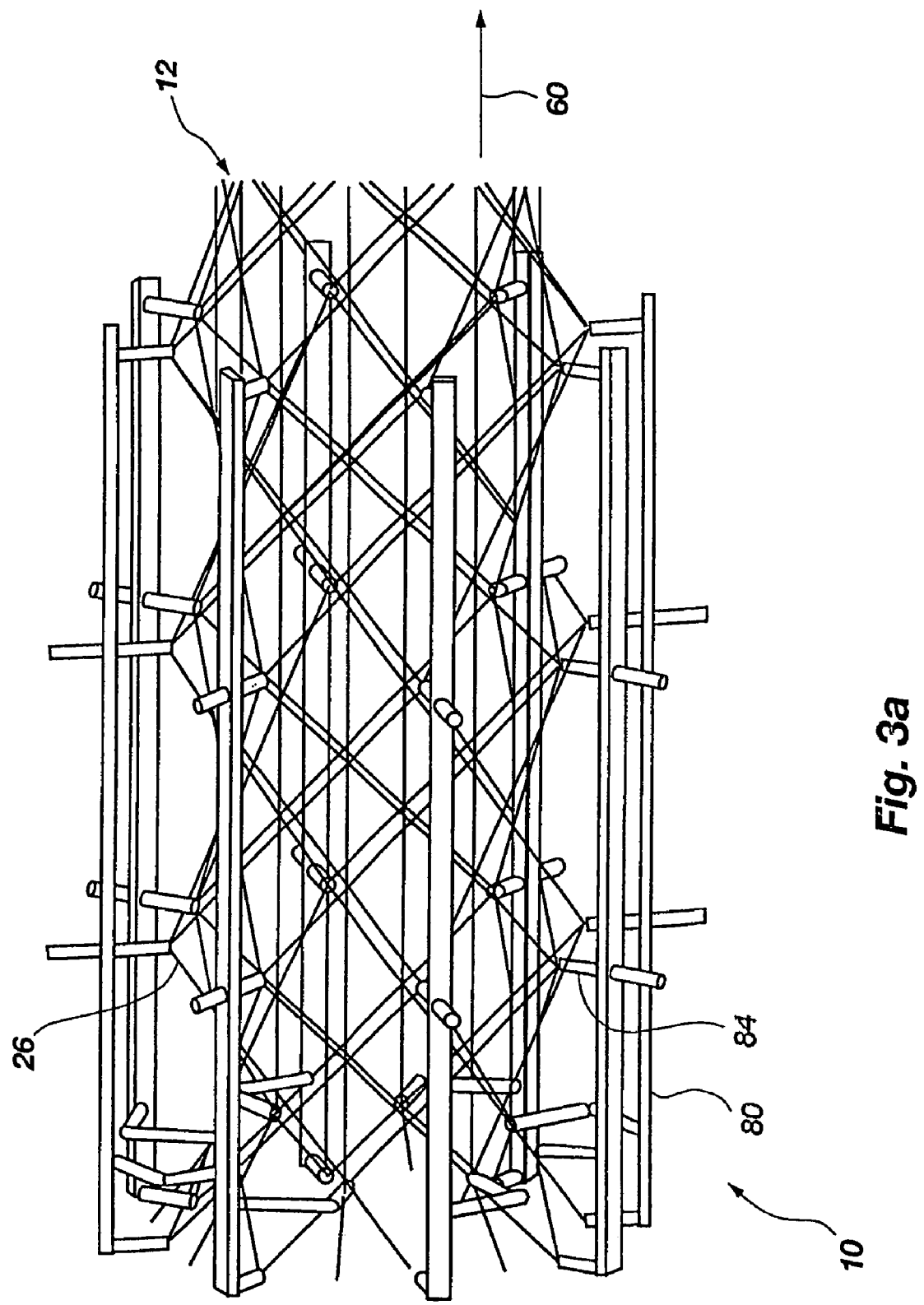
FIG. 3a is a partial perspective view of the apparatus of FIG. 1.

As shown in FIG. 2a, the apparatus 10 can include a separate fiber feed source 62 for each component. Thus, in this embodiment, the apparatus 10 includes twenty-four fiber feed sources 62 (four helical sources 63a, b, c & d; four reverse helical sources 64a, b, c & d; four rotated helical sources 65a, b, c & d; four rotated reverse helical sources 66a, b, c & d; and eight straight sources 67a, b, c, d, e, f, g & h, as shown in FIGS. 2a and 2b). It is of course understood that the number of fiber feed sources 62 depends on the number of components, which can vary depending on the configuration of the structure to be fabricated. The fiber feed sources 62 can be spaced around the axis 14 at various inclinations and radially spaced positions to facilitate drawing the fibers through the processing path.

In addition, each fiber feed source 62 can provide a plurality of fibers or tows 50 that are grouped together in the strands to form the individual components of the structure 12. For example, a single tow can be formed of several thousand individual fibers. As discussed in greater detail below, the plurality of fibers or tows 50 from each fiber feed source 62 can be twisted or rotated together (indicated by arrow 68), wrapped, braided, or overwrapped with a braid to form the strands.

A rotational or displacement element(s) can be associated with the fiber feed sources 62 and frame or base support member 54 to displace the fibers 50 or fiber feed sources 62 around the processing path 58 or axis 14, as indicated by perimeter arrows 70 and 72. The rotational element(s) can include first and second rotational elements rotatable with respect to the processing path 58 around the axis 14 in opposite directions 70 and 72 to wind the continuous fibers 50 in opposite directions to form the helical and reverse helical components 30 and 34.

For example, the first rotational element can rotate the four helical sources 63a, b, c & d (for the four helical components 30) in a first direction 70, while the second rotational element can rotate four reverse helical sources 64a, b, c & d (for the four reverse helical components 34) in a second direction 72. The first rotational element also may rotate the four rotated helical sources 65a, b, c & d in the first direction 70, while the second rotational element also may rotate the four rotated reverse helical sources 66a, b, c & d in the second direction 72. Alternatively, a third rotational element can rotate the four rotated helical sources 65a, b, c & d (for the four rotated helical components 38) in the first direction 70, while a fourth rotational element can rotate four rotated reverse helical sources 66a, b, c & d (for the four rotated reverse helical components 42) in the second direction 72.

Figure 5A:
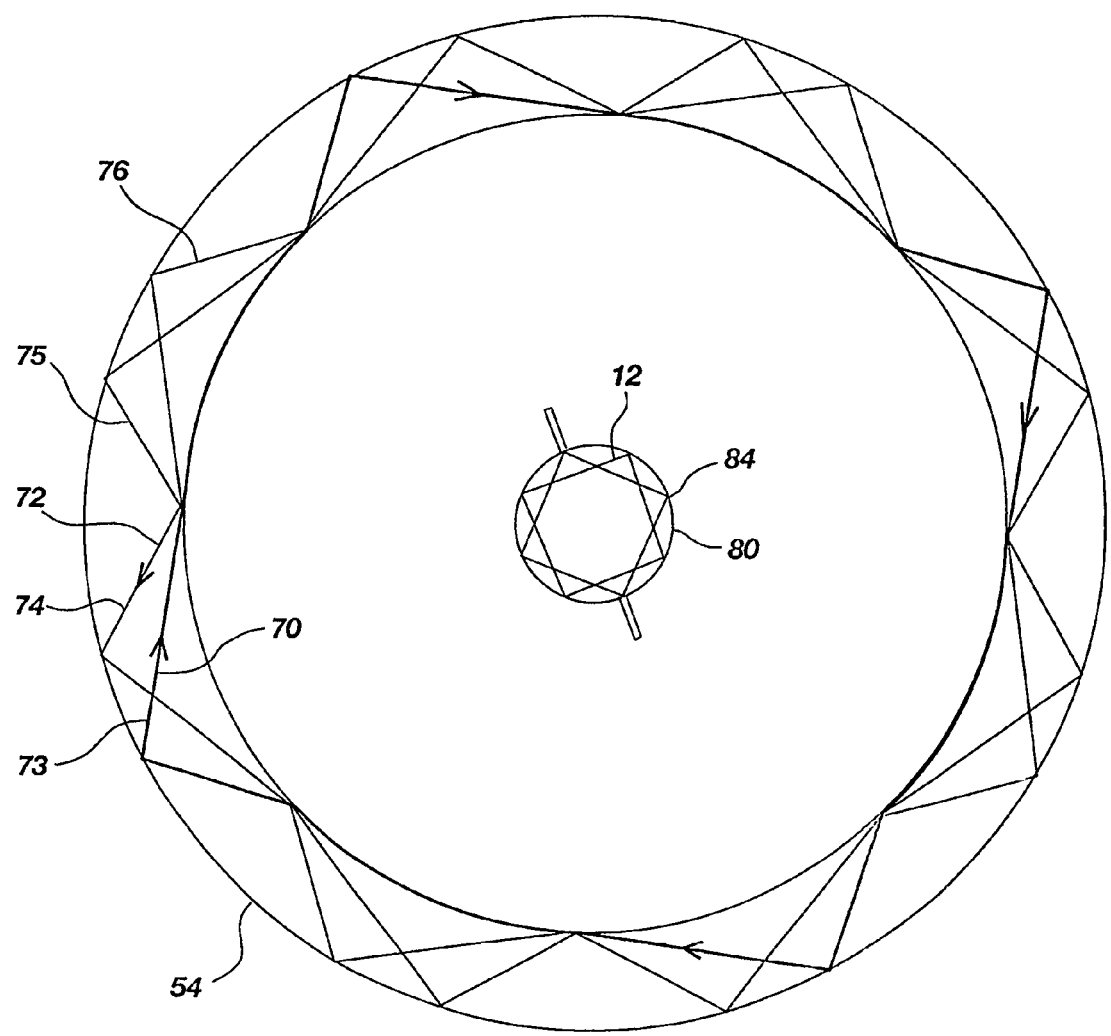
FIG. 5a is a schematic end view of the apparatus of FIG. 1 showing travel paths.

Referring to FIG. 5a, the first rotational element, or the four helical sources 63a, b, c & d, can follow a first path 73 in the first direction 70, while the second rotational element, or the four rotated helical sources 64a, b, c & d, can follow a second path 74 in the second direction 72. The paths 73 and 74 can share portions, but have separate portions where the fiber feed sources 62 can pass one another while traveling in different directions, as shown. Similarly, the third rotational element, or the four rotated helical sources 65a, b, c & d, can follow a third path 75 in the first direction 70, while the fourth rotational element, or the four rotated reverse helical sources 66a, b, c & d, can follow a fourth path 76 in the second direction 72.

The rotational element(s) can include tracks on the paths along which the fiber feed sources 62 travel. The rotational element(s) can include rotating frames to which the fiber feed sources 62 are coupled so that the fiber feed sources also travel along the paths as the rotating frames rotate.

Figure 5B:
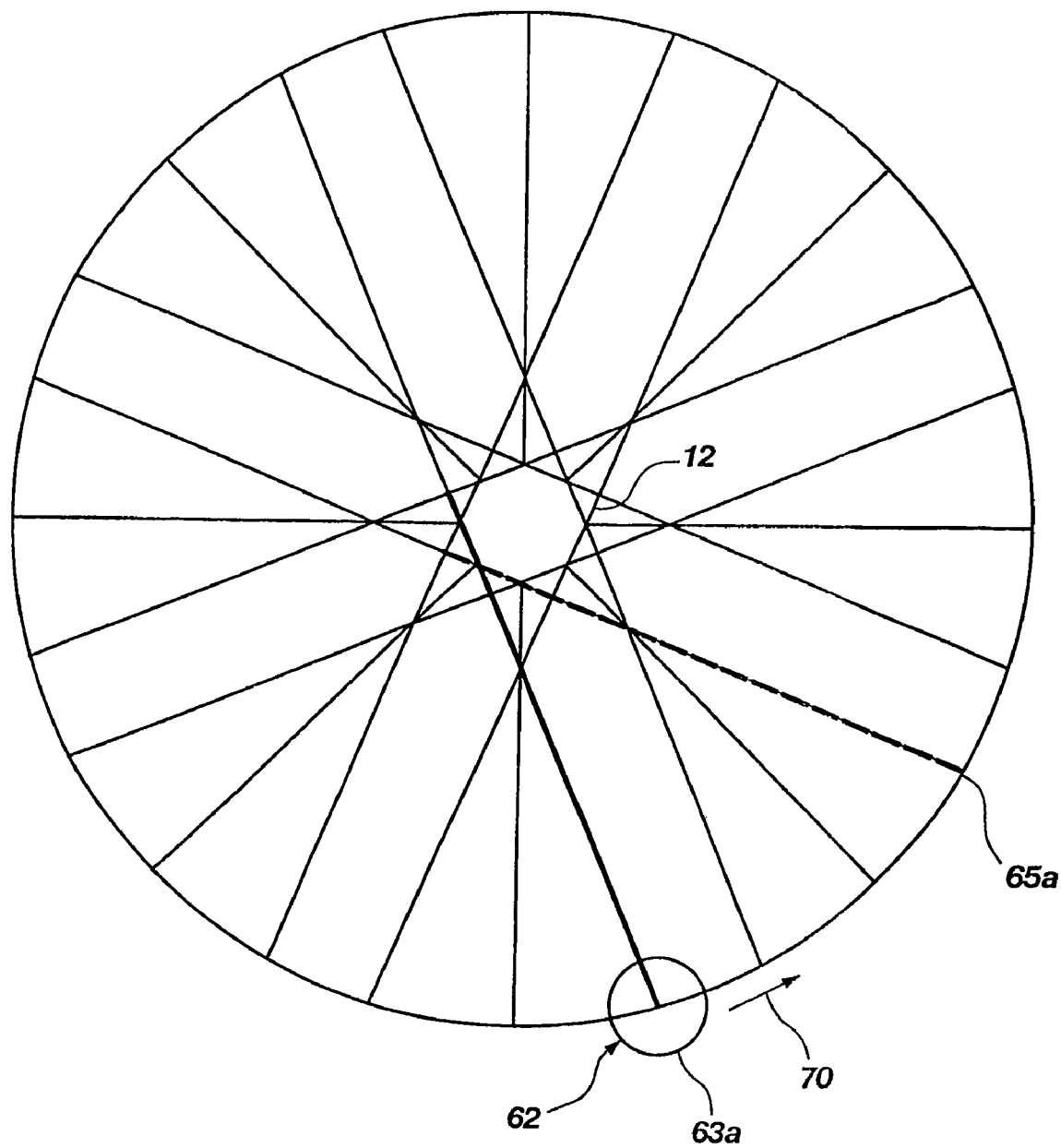
FIGS. 5b–5d are schematic end views of the apparatus of FIG. 1 showing the operation of the apparatus.
Figure 5C:
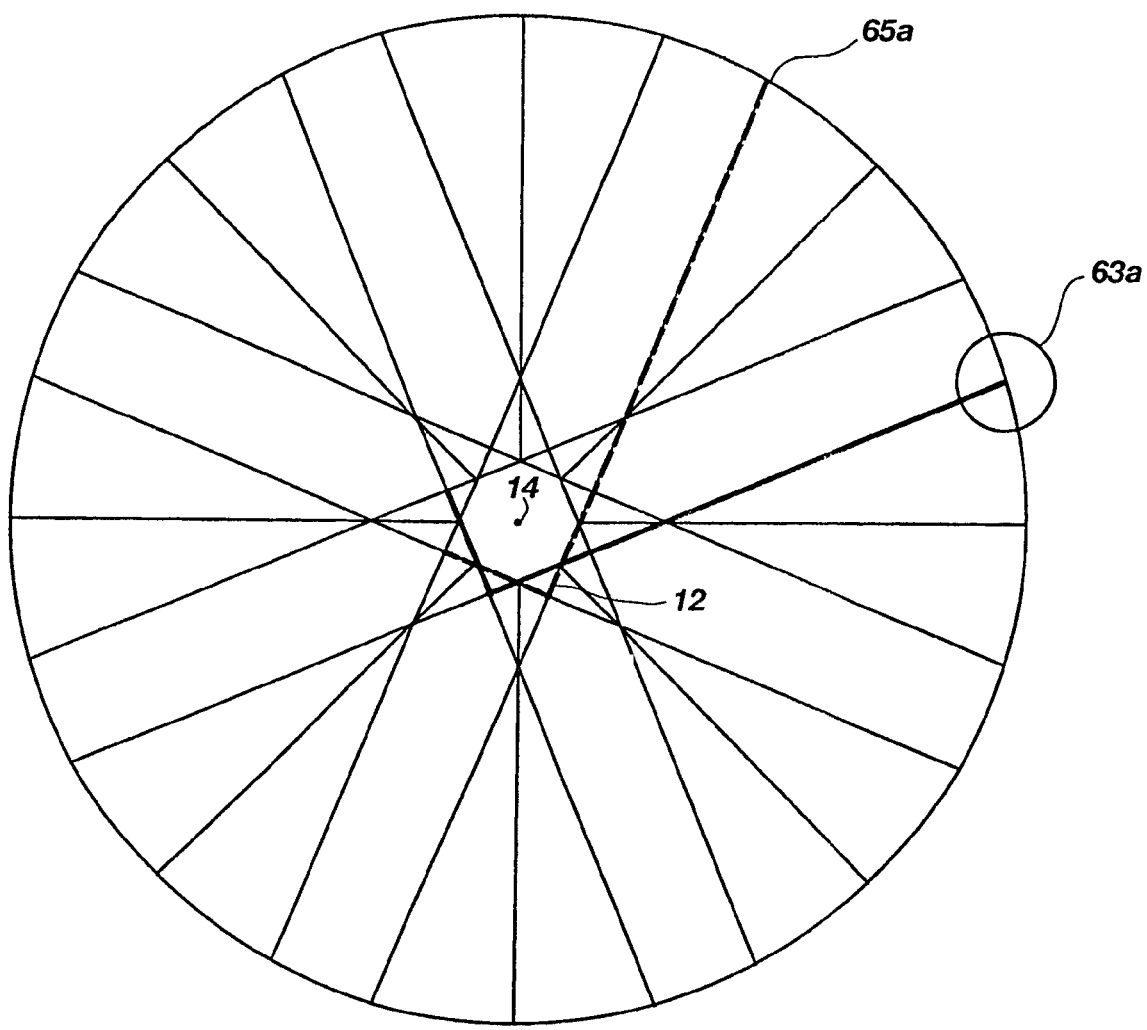
Figure 5D:
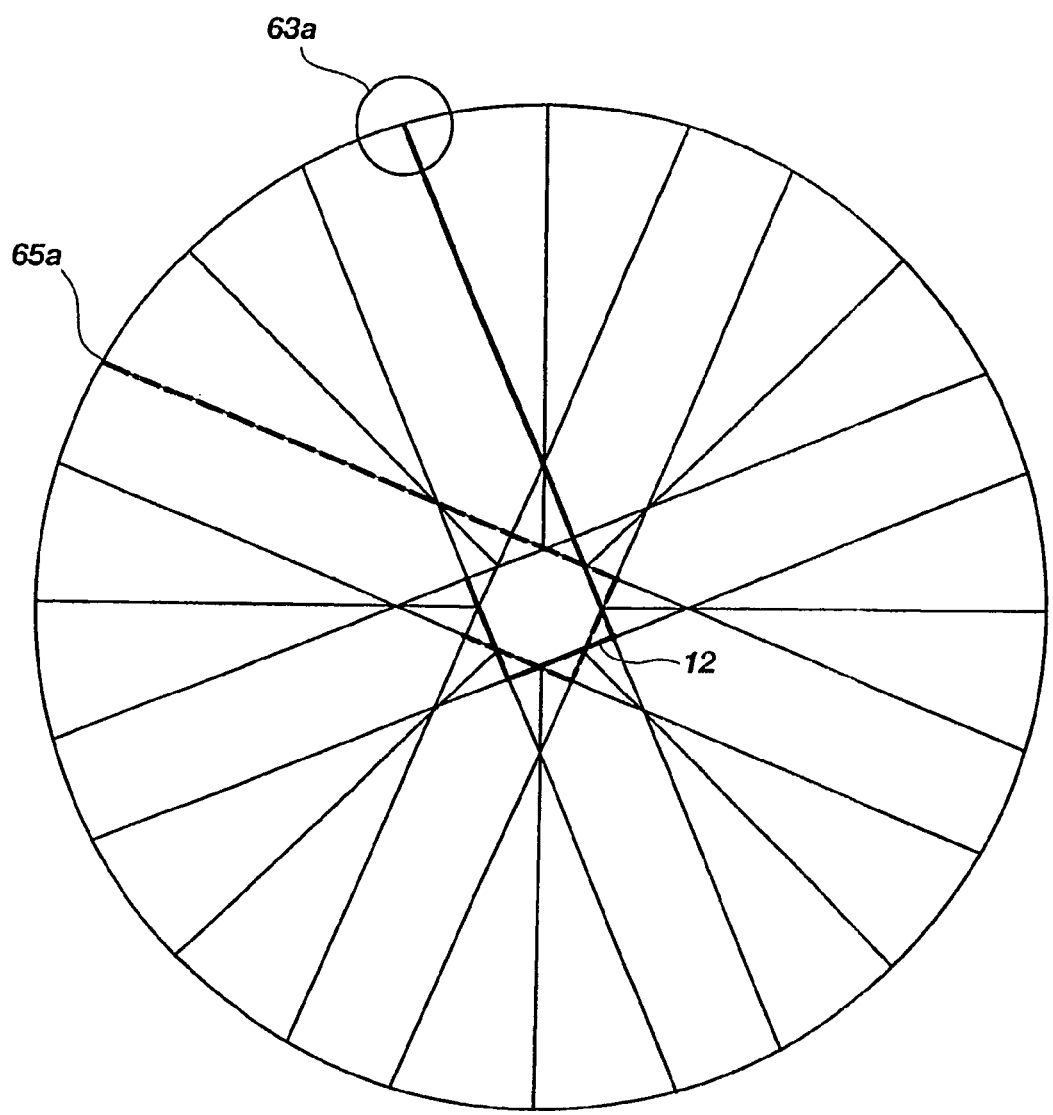

Referring to FIGS. 5b–d, the first helical source 63a is shown rotating about the axis 14 (FIGS. 1–2b) in the first direction 70 with the fibers graphically illustrated in bolded format. Similarly, the first rotated helical source 65a is shown rotating about the axis in the first direction 70 with the fibers graphically illustrated in dashed and bolded format.

Figure 5E:
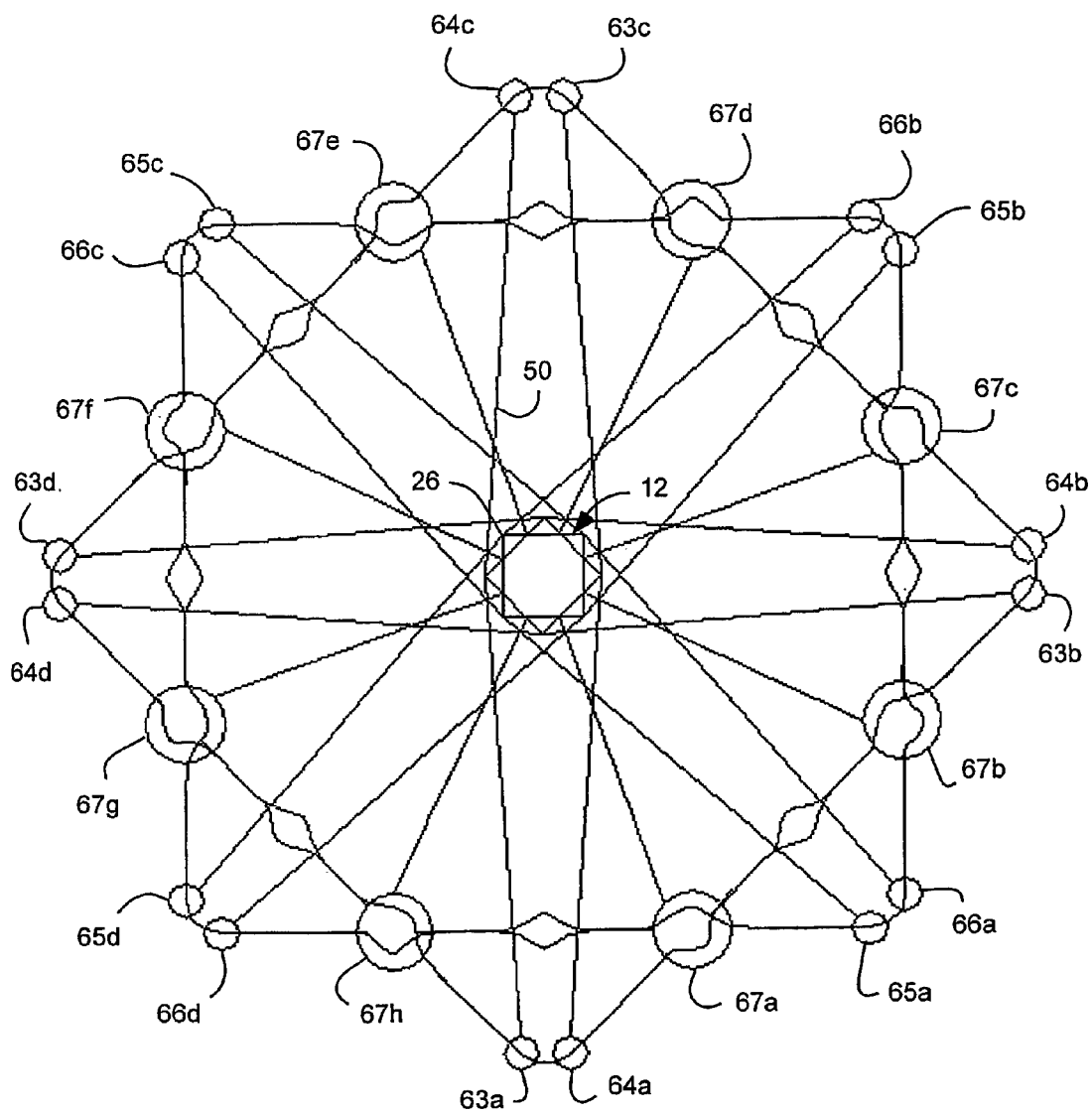
FIG. 5e is a schematic end view of the apparatus of FIG. 1 showing travel paths.

As shown and described above, the tracks or paths along which the fiber feed sources travel can be substantially circular. Alternatively, the tracks or paths can be straighter or more square or rectangular. Referring to FIG. 5e, an alternative configuration of the paths or tracks of the rotational elements or fiber feed sources is shown. The paths or tracks can have a straighter configuration that more closely resembles the cross-sectional shape of the structure being formed.

Referring again to FIG. 1, an orientation guide member 77 can be associated with the frame or base support member 54 and positioned between the fiber feed sources 62 and the processing path 58 to receive the continuous fibers 50 from the plurality of fiber feed sources 62 for angularly reorienting the continuous fibers 50 to a desired pre-processing configuration about the axis 14. The orientation guide member can be a ring for guiding the fibers 50 from the fiber feed sources 62 to the processing path 58. The preprocessing configuration represents the reorientation of the fibers 50 from the feed sources 62 to a longitudinally stressed skeletal structure along the processing path 58.

An intermediate support element or member 80 can be disposed at the processing path 58 and associated with the frame or base support member 54. The intermediate support element 80 can include a plurality of engagement members 84 disposed around the processing path 58 to engage the nodes, such as the external nodes 26 of the components 20, and to direct and maintain the nodes 26 of the components 20 radially outwardly from the longitudinal axis 14. Thus, the intermediate support element 80 and/or engagement members 84 form the sequential discrete or straight segments 22 in the helical and reverse helical components 30 and 34. The intermediate support element 80 and/or engagement members 84 support the fibers 50 in the configuration of the structure 12. As discussed in greater detail below, the engagement members 84 can travel with the structure 12 as the fibers 50 are drawn through the processing path 58. The engagement members 84 and/or intermediate support element 80 also can be a puller or traction member to pull the fibers through the processing path, as described below. The intermediate support element 80 can be disposed around the structure 12 with the engagement members 84 engaging the nodes 26 from the exterior of the structure 12, as shown. The engagement members 84 can include hooks, notches, or grooved heads around which the fibers 50 are wound. The engagement members 84 and/or intermediate support element 80 form an external support structure for the fibers, as opposed to a traditional internal mandrel configured to support the entire inner surface of the structure.

The engagement members 84 can engage or contact the structure substantially only at the nodes. The engagement or contact can be localized at or along the nodes. The engagement members 84 can bias the nodes radially outwardly from the longitudinal axis. Thus, the engagement members 84 can exert a radial force on the structure at the nodes. The engagement members 84 form the straight segments in the structure. The engagement members 84 can establish free space points intermittently which operate to support the nodes of the structure without a traditional internal mandrel that is continuous.

The intermediate support element 80 and/or engagement members 84 can be radially displacable and operable with respect to the fibers 50 to intermitently draw or displace fibers 50 from the axial support configuration and along a radial path with respect to the elongate axis 14 to a stable, extended position representing the three-dimensional structure 12. Thus, the configuration of the structure 12 or operating skeleton can be maintained without the aid of an internal mandrel or cavity die.

The intermediate support element 80 and/or engagement members 84 can be located radially outwardly to correspond to the desired size or diameter of the structure 12. In one aspect, the engagement members 84 are adjustably positioned with respect to the axis 14 so that a structure 12 of any desired size or diameter can be formed. The intermediate support element 80 and/or the engagement members 84 can be displaced radially outwardly during processing so that changes in diameter can be accomplished during processing.

The engagement members 84 can be provided in sets or groups corresponding to the number of nodes. For example, the intermediate support element 80 can have eight sets of engagement members 84 corresponding to the eight nodes 26 of the structure 12. In one aspect, the number of sets can be adjustable to correspond to the desired number of nodes. In another aspect, numerous sets can be provided, with only some being used depending on the number of desired nodes.

The adjustable nature of the engagement members 84 and/or support element 80 can provide for easier manufacture of geometry specific tooling. It will be appreciated that minor changes made to traditional structures requires that a new mandrel be machined.

As described above, the intermediate support element 80 and/or engagement members 84 can support and maintain the fibers from outside the structure. Thus, the intermediate support element 80 and/or engagement members 84 do not interfere with the various segments that cross or intersect the interior of the structure. As discussed above, a traditional, internal, continuous mandrel can be difficult to withdraw from the interior of the structure because of the segments that cross or intersect the interior. In another aspect, the intermediate support structure or engagement members alternatively can be disposed in the interior of the structure. The engagement members would still only engage or contact the structure substantially only at the nodes, as described above. The engagement members disposed inside the structure can provide a non-continuous interior support. The engagement members can move along the processing path, and can pivot or displace inwardly at the end of the processing path to avoid interference with the crossing or intersecting segments of the structure. Such a configuration can be useful for larger diameter structures that can allow more room in the interior.

A resin applicator 90 can be associated with the frame or base support member 54 to apply resin to the continuous fibers 50, as is known in the art. The resin applicator 90 can include a nozzle to spray or drip resin onto the fibers. The resin can be applied to the fibers 50 while the fibers 50 are supported by the engagement members 84. In addition, the resin can be applied to the fibers 50 prior to engagement by the engagement members 84 so that the engagement members do not block the application of the resin. A nozzle or spraying is one example of means for applying resin to the fibers. Other means for applying resin to the fibers include, for example, a resin bath through which the fibers are drawn, multiple spray nozzles, prepreg (pre-impregnated) fibers, etc. Applying the resin to the fibers creates a liquid resin/fiber composite.

An oven, heat source, or other curing device 96 can be associated with the frame or base support member 54 to help cure the resin, as is known in the art. The resin can be cured while the fibers 50 are supported by the engagement members 84. An oven or heat source is one example of means for curing the resin or the liquid fiber/resin composite. Other means for curing the resin include, for example, heat, forced air, UV radiation, microwaves, electron beam, laser beam, etc. Curing the resin or liquid resin/fiber composite creates a sturdy, rigid, three-dimensional truss structure capable of bearing multidirectional loading.

Figure 6:
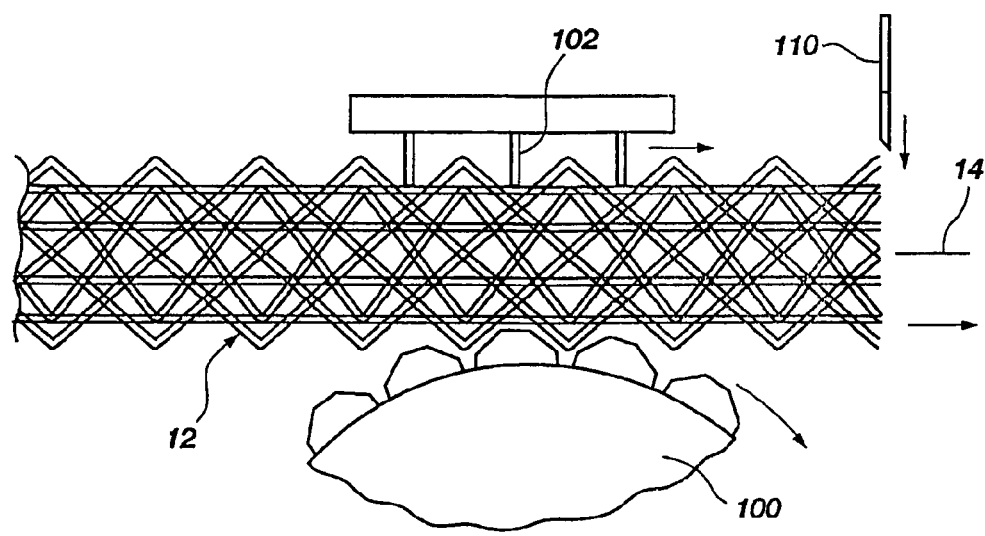
FIG. 6 is a schematic view of a portion of the apparatus of FIG. 1 showing a pulling and cut-off mechanism.
Figure 3B:
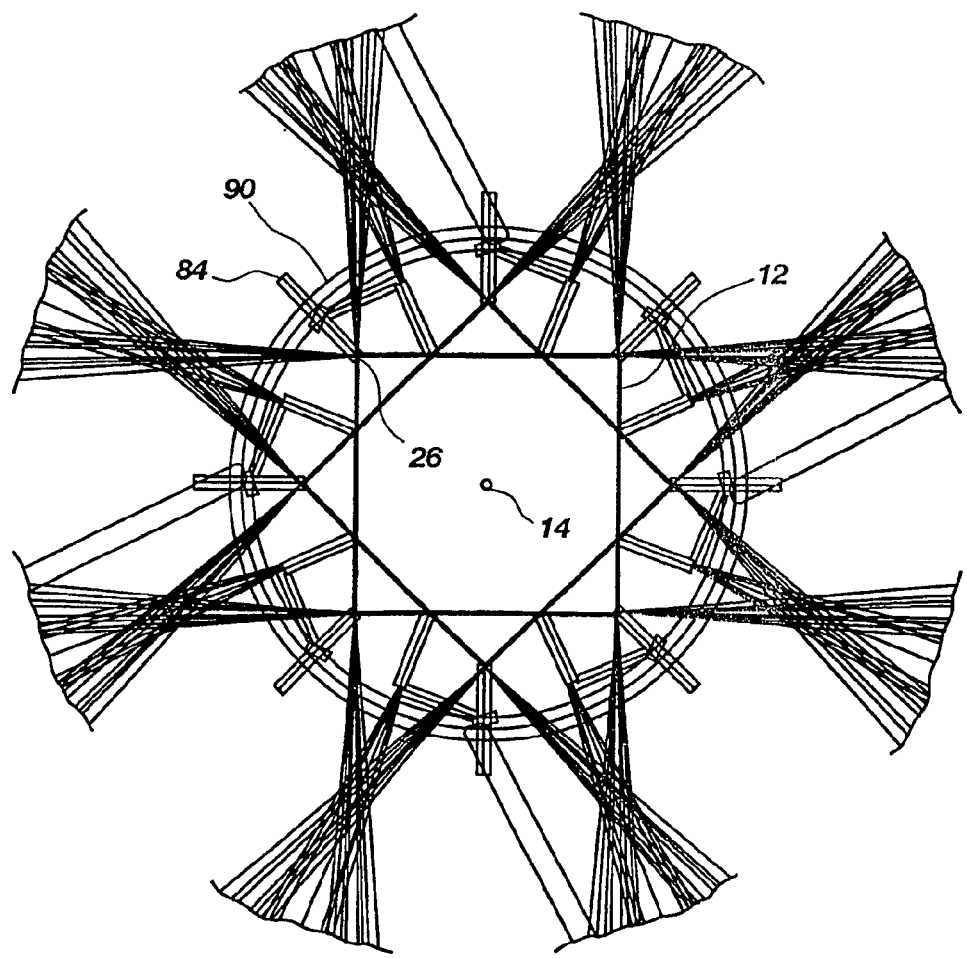
FIG. 3b is a partial end view of the apparatus of FIG. 1.

Referring to FIG. 6, a puller or traction member can be associated with the frame or the base support member 54 to apply axial tension and pull the continuous fibers 50 and/or the structure 12 through the processing path 58. The puller also can engage the cured resin/fiber composite structure, such as with the use of a gear-like device 100 with teeth that intermesh with the cured structure. The puller also can engage the structure with graspers 102 that grasp the structure or components, such as the axial components. The graspers can be pneumatically, hydraulically, electrically or mechanically actuated. As stated above, as the structure 12 and fibers 50 are pulled through the processing path 58, the engagement members 84 and/or intermediate support element 80 can move with the structure 12. In one aspect, the engagement members 84 can move along the intermediate support element 80. In another aspect, the engagement members 84 also can be used as the puller or traction member. Thus, the structure 12 can be fabricated with any desired length, while at the same time having variable radial dimensions.

A cutter 110 also can be associated with the frame or base support member 54 to cut the structure 12 to a desired length. The cutter 110 can include a blade to cut through the various components and/or segments, and may be operated along any transverse orientation with respect to the longitudinal axis 14. In addition, the cutter can include a high-pressure fluid jet, water jet, laser beam, or any other cutting mechanism.

Figure 7:
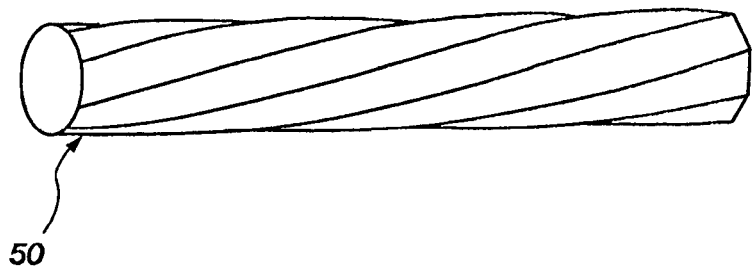
FIG. 7 is a perspective view of a plurality of fibers twisted by the apparatus of FIG. 1 in accordance with the present invention.
Figure 8:
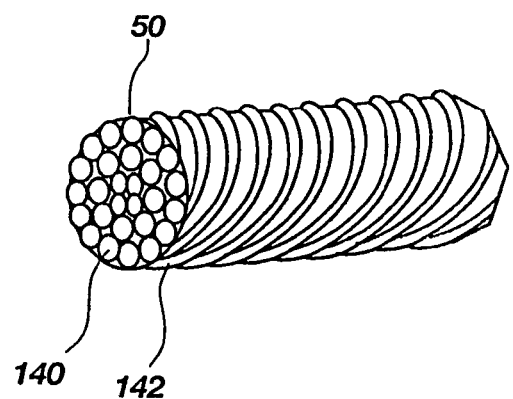
FIG. 8 is a perspective view of a plurality of fibers wrapped by the apparatus of FIG. 1 in accordance with the present invention.
Figure 9:
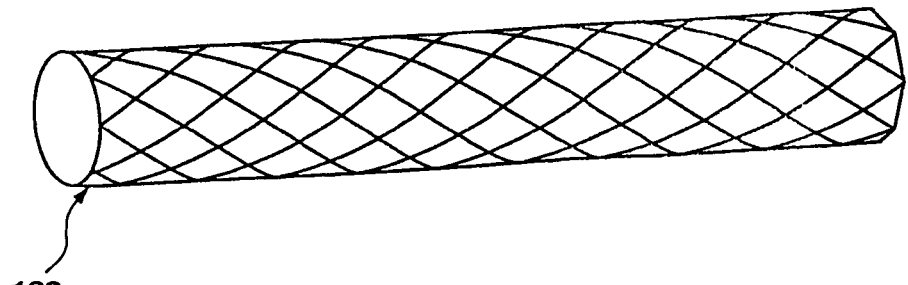
FIG. 9 is a perspective view of a plurality of fibers braided by the apparatus of FIG. 1 in accordance with the present invention.

The fibers of the various components (helical, reverse helical, and straight/axial) intersect and/or overlap. In both cases, gaps can result between the individual fibers or tows, and reduce the strength of the component, segment, or total structure by up to 90%. The apparatus 10 advantageously can include mechanisms to reduce the gaps by twisting, wrapping, and/or braiding the fibers together. FIGS. 7–9 show fibers that have been twisted, wrapped and braided, respectively.

The apparatus 10 can include a twisting member to twist (indicated by arrow 68 in FIGS. 1 and 2*a*) the plurality of fibers 50 from a fiber feed source 62 together. The twisting member can be coupled between the rotational element and the fiber feed source 62, and can twist the fiber feed source 62. In addition, the twisting member can include the fiber feed source 62 being rotatably coupled to the rotational element or frame. The twisting member is twistable to cause a plurality of adjacent fibers to twist around one another and reduce or prevent any gaps between the fibers, as shown in FIG. 7.

In addition, the apparatus can include a wrapping member to wrap a group of fibers. The wrapping member can be associated with the fiber feed source 62 and/or the rotational element. The wrapping member can be rotatable around a plurality of fibers to wrap the plurality of fibers with another plurality of fibers to reduce or prevent any gaps between the fibers. In addition, as shown in FIG. 2*a*, the fiber feed source 62 can include an inner fiber feed source 136, and an outer fiber feed source 138. The outer fiber feed source 138 can rotate (indicated by arrow 68 in FIGS. 1 and 2*a*) about the inner fiber feed source so that outer fibers from the outer fiber feed source are wrapped around inner fibers from the inner fiber feed source. Thus, the wrapping member can form a core 140 of substantially straight fibers 50 surrounded by a layer of wrapped fibers 142, as shown in FIG. 8.

In addition, the apparatus can include a braiding mechanism to braid the fibers 160 together. The braiding mechanism can include the fiber feed sources 62 configured to interweave with one another. The fiber feed sources 62 can be configured to separate the plurality of fibers 50 or tows, as shown in FIG. 2*a*, such that the fibers or tows can be passed through or between one another to braid or interweave the fibers. Thus, the fibers in the various fiber feed sources can traverse one another and/or intersect one another to form a braid, as shown in FIG. 9.

Figure 9B:
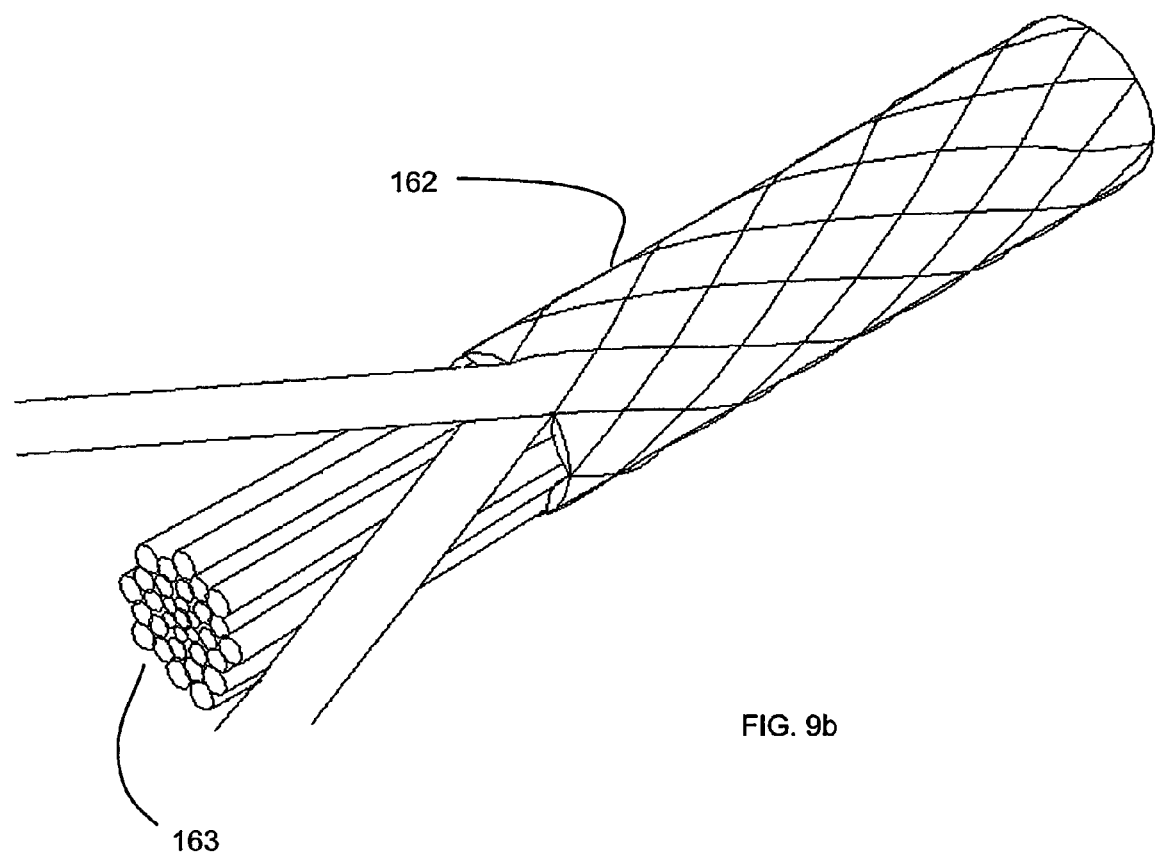
FIG. 9b is a perspective view of a sleeve of braided fibers surrounding a core of fibers by the apparatus of FIG. 1 in accordance with the present invention.

In addition, a braided sleeve 162 can encapsulate a core of straight or twisted fibers 163, as shown in FIG. 9*b*. The apparatus can include a braiding mechanism to rotate around a plurality of fibers to wrap the plurality of fibers with another braided plurality of fibers. Inner and outer fiber feed sources can be provided with the outer fiber reed source including the braiding mechanism.

Figure 10A:
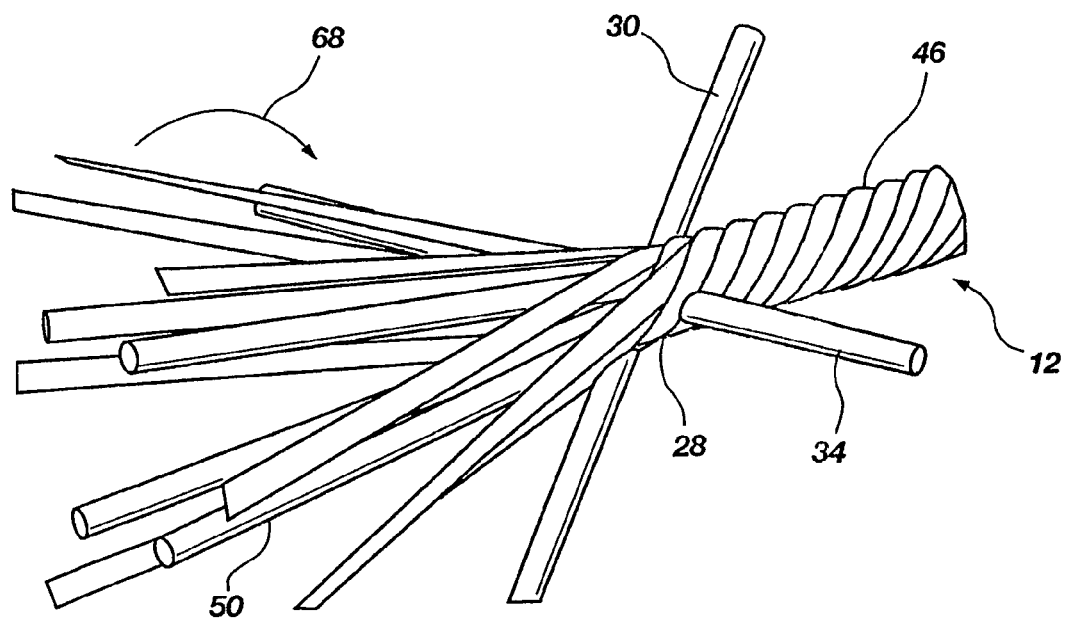
FIGS. 10a and b are partial perspective views of the structure of FIGS. 4a and b, showing a node or intersection.
Figure 10B:
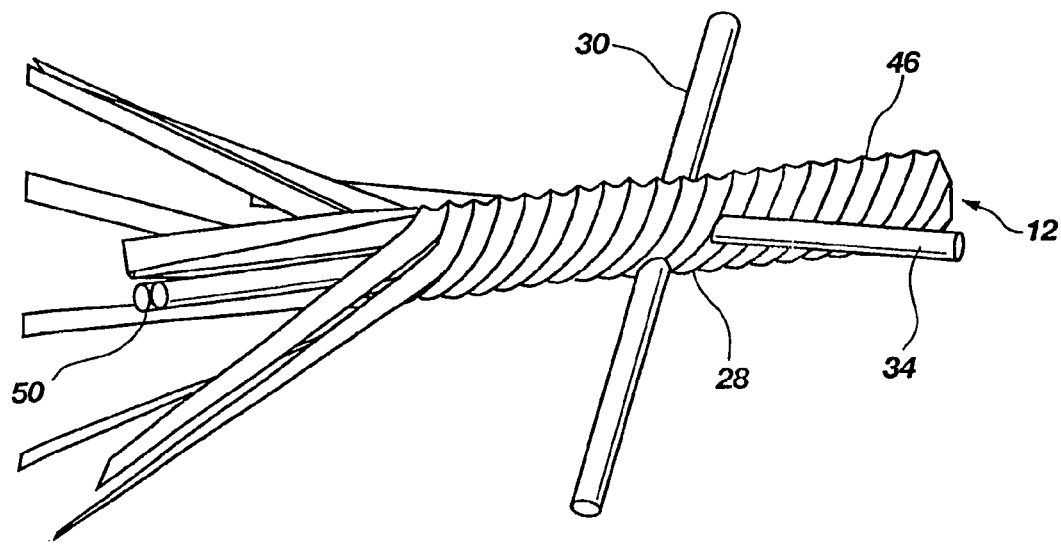
FIG. 10c is a cross sectional view of the structure of FIGS. 4a and 4b showing an intersection.
FIG. 10d is a cross sectional view of the structure of FIGS. 4a and 4b showing an intersection.
FIG. 10e is a partial side view of the structure of FIGS. 4a and 4b.
FIG. 10f is another partial side view of the structure of FIGS. 4a and 4b showing an off-set intersection.
Figure 10C:
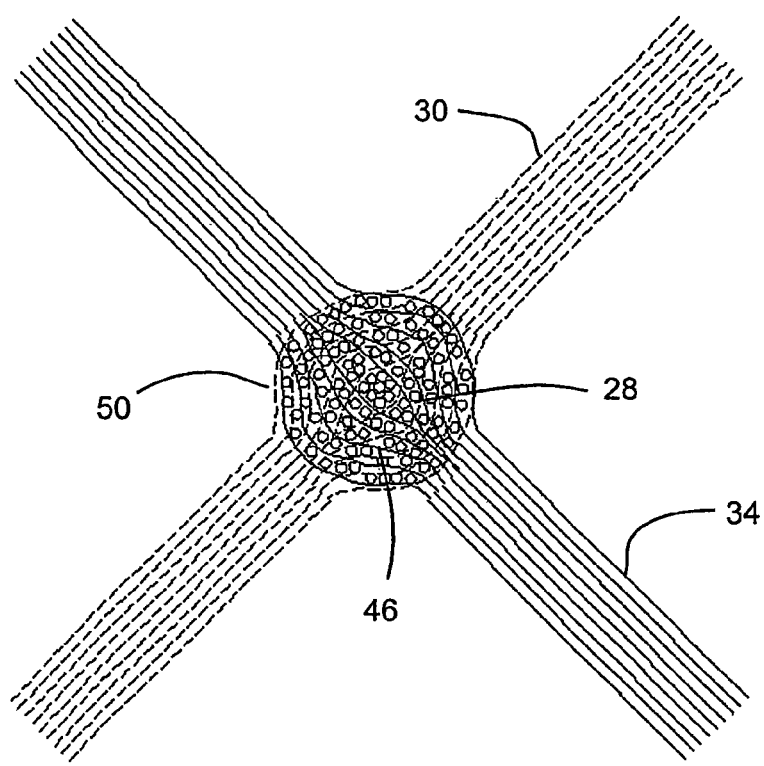
Figure 10D:
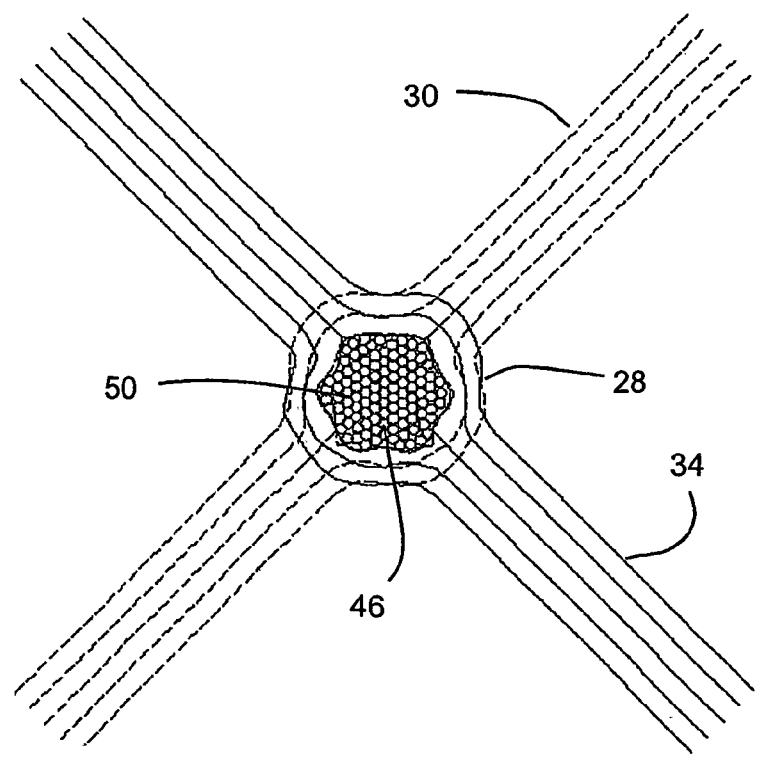

Referring to FIGS. 10*a*–*c*, the interwoven relationship of fibers is illustrated at an internal node 28 of the structure 12 being fabricated. It will be appreciated that the internal node illustrated in the figures can be representative of any intersection or any node in the structure. The helical component 30, reverse helical component 34, and straight or axial internal member 46 intersect at the internal node 28. As stated above, the fibers 50 of the components 30, 34 and 46 can overlap one another. Specifically, as shown in FIGS. 10*a* and *c*, the fibers 50 of the helical and reverse helical components 30 and 34 can pass between the fibers 50 of the straight or axial component 46. It is of course understood that the fibers 50 of all the components can pass between the fibers of other components. For example, the fibers or tows from a fiber feed source, such as straight or axial feed source 67*a* in FIG. 2*a*, can be separated a sufficient distance so that the fibers or other fiber feed source can pass therethrough, such as helical and reverse helical feed sources 64*a* and 65*a* in FIG. 2*a*. In addition, it is understood that the components can merely pass by one another. The overlaying or intersecting fibers, however, can form gaps between the fibers. As previously mentioned, such gaps can reduce the strength of the structure by as much as 90%. It will be appreciated that the strength of the structure is derived from the synergy of the collective fibers as a bundle. Thus, isolating or separating fibers has a detrimental effect on the strength of the structure. The fibers 50 of the components 30, 34 and/or 46 advantageously can be twisted, wrapped, braided, or wrapped with a braid as described above, to condense the fibers and reduce any gaps, and increase the strength of the fibers, and the structure.

Alternatively, the relationship of the fibers of the nodes or intersections of the components can have other configurations. Referring to FIG. 10*c*, the helical component 30, reverse helical component 34, and straight or axial internal member 46 intersect at the internal node 28. The fibers of the axial internal member 46 can be maintained in a single tow or strand with the fibers of the helical and reverse helical components 30 and 34 surrounding the axial internal member 46. Thus, the axial internal member 46 intersects the helical or reverse helical members 30 and 34. Therefore, the fibers of the axial internal member 46 are maintained together in a substantially straight configuration, and without gaps. The fibers or tows from a fiber feed source, such as helical and reverse helical feed sources 64*a* and 65*a* in FIG. 2*a*, can be separated to pass around the fibers or other fiber feed source, such as straight or axial feed source 67*a* in FIG. 2*a*. It will be appreciated that the helical and reverse helical components 30 and 34 can similarly be maintained together, with the axial member 46 surrounding them.

Figure 10E:
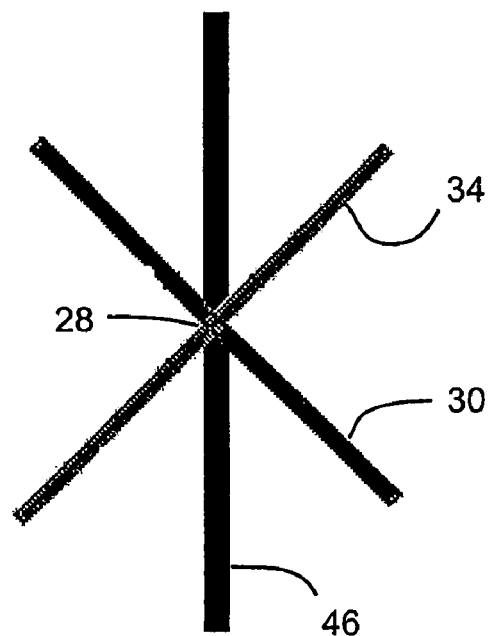
Figure 10F:
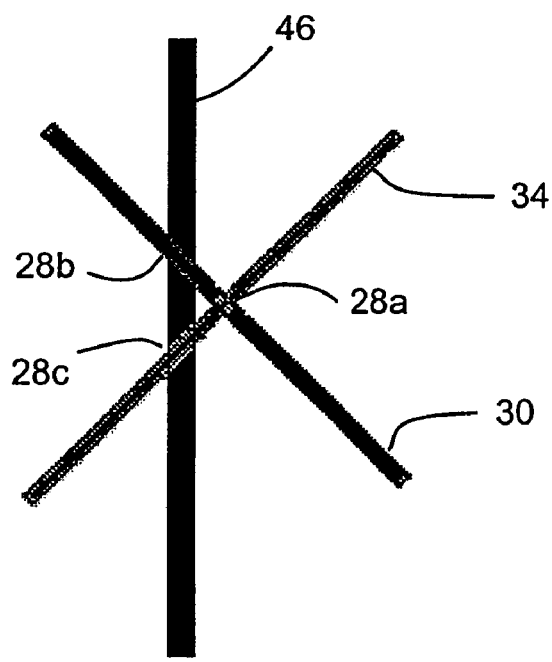

Referring to FIG. 10*e*, the helical component 30, reverse helical component 34, and straight or axial internal member 46 can intersect at the internal node 28 that is in a single location. While the components have been described above as intersecting at a node, it will be appreciated that the intersection of many fibers can create a bulky node, and may introduce gaps. In addition, the intersection of the many fibers can create nonlinearities in the fibers that also degrade their structural performance. In one aspect, the nodes or intersections can be off-set with respect to one another. Thus, the nodes or intersections can be off-set, or spaced apart, forming a grouping of different nodes or intersections in close proximity to one another. Referring to FIG. 10*f*, the helical component 30, reverse helical component 34, and internal member 46 can intersect at different locations, thus forming a plurality of nodes or intersections in close proximity to one another. The helical and reverse helical components 30 and 34 can intersect one another at one node 28*a*. The helical component 30 can intersect the axial internal member 46 at another node 28*b*, while the reverse helical component 34 can intersect at another node 28*c*. Thus, a single node or point of intersection can be separated into two or more nodes or intersections to reduce the bulk of the intersections and to reduce gaps.

Figure 11A:
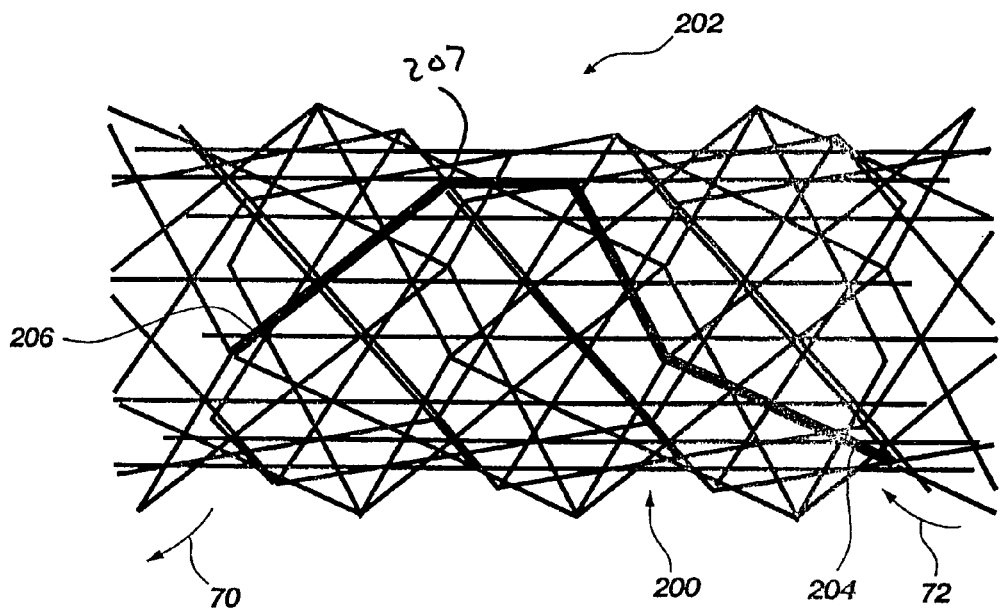
FIGS. 11a and b are side views of a structure fabricated in accordance with the present invention without one of the regularly occurring nodes.
Figure 11B:
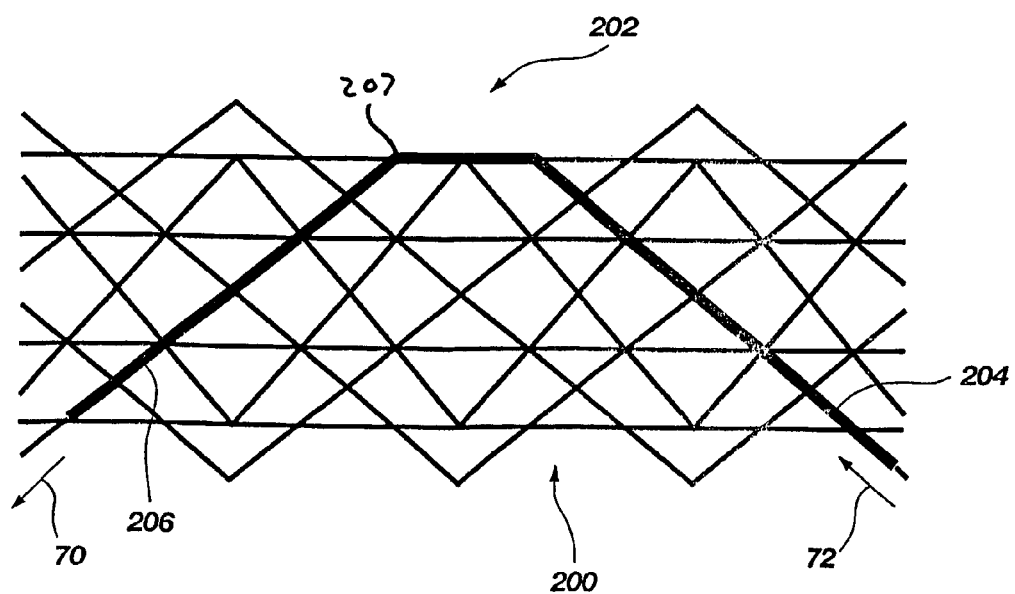
FIGS. 11c and d are side views of a structure fabricated in accordance with the present invention without one of the regularly occurring nodes for attachment.
FIG. 11e is a partial side view of the structure of FIGS. 4a and 4b showing a node.
Figure 11C:
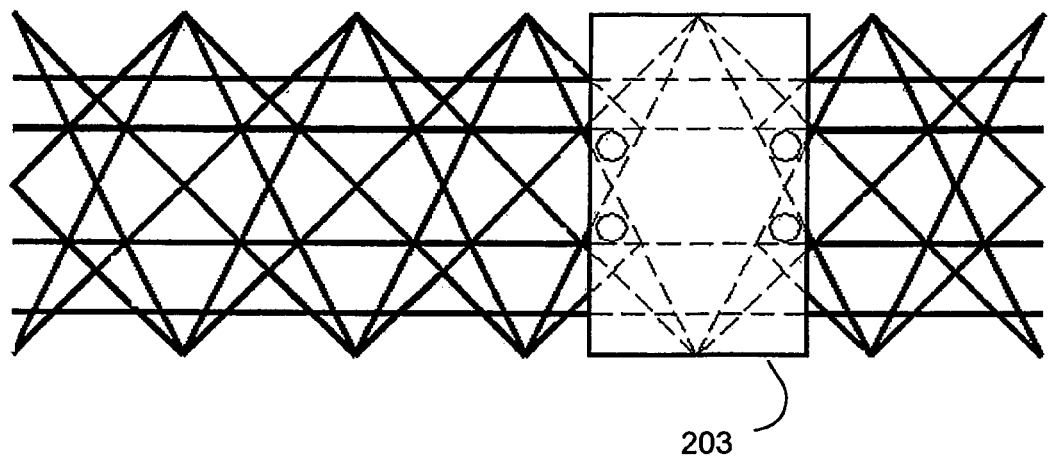
Figure 11D:
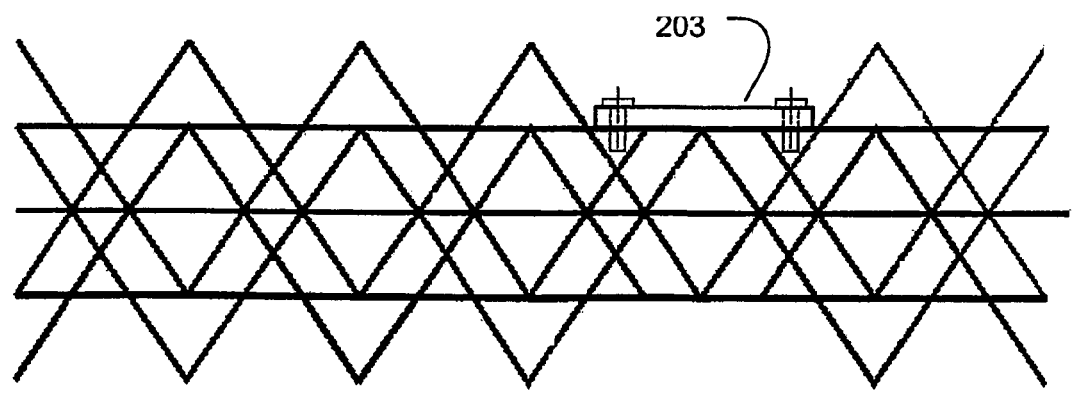

The apparatus 10 also can be configured to create structures without one or more of the nodes. Referring to FIGS. 11*a* and 11*b*, another truss structure 200 is shown which has been fabricated without a node at one of the regular intervals, indicated at 202. Such a configuration provides a flatter area against the structure 200 which can facilitate connecting another truss structure or object 203 to the structure 200, as shown in FIGS. 11*c* and 11*d*. As stated above, it is desirable to form the structure from continuous fibers to preserve the strength of the structure. While such a node can be cut from a structure, doing so cuts the fibers, and can reduce the strength of the fibers, components, and/or structure. The structure 200 shown, however, has been formed without a node, but with continuous fibers. The structure 200 has been formed by changing the regular direction or orientation of some of the components, such as the helical and reverse helical components that would have formed the node. For example, one reverse helical component 204, shown in bold, is shown wrapping around the structure in the second direction 72, then continuing longitudinally along one of the straight or axial components 46, then wrapping around the structure in the first direction 70. It will be appreciated that the corresponding helical component can be similarly reoriented. Thus, the reverse helical component 204 reverses directions to become a helical component 206. To form the structure 200, the corresponding fiber feed sources can have their directions reversed.

The truss structure 200 illustrated in FIGS. 11*a* and *b* also is exemplary of another type of truss structure in which one or more single, continuous fibers or strands form two or more different components of the structure. For example, as shown in FIGS. 11*a* and *b*, a single, continuous fiber or strand is shown forming three different components of the structure, namely a reverse helical component 204, a straight or axial component 46, and a helical component 206. The single, continuous fiber or strand, thus transitions from one component to another at a transitional node 207. Transitioning the fibers or strands between several components can have several advantages. For example, transitioning the fibers can increase the number or percentage of fibers is certain desired components, while reducing the number or percentage of fibers in other components, to add strength to the desired components, and thus tailor the structure to the desired application or known stress or load concentrations. In addition, transitioning the fibers also can change the orientation of the fibers at desired nodes to align the fibers in desired directions to take advantage of the properties of the fibers. For example, it will be appreciated that intersecting a plurality of fibers can cause stress or loading to be placed between the fibers, where they are weaker, rather than along the fibers themselves, where they are stronger. Thus, transitioning the fibers can reorient the fibers so that intersecting fibers apply stress or loading against the fibers, and increase the strength of the structure.

Figure 11E:
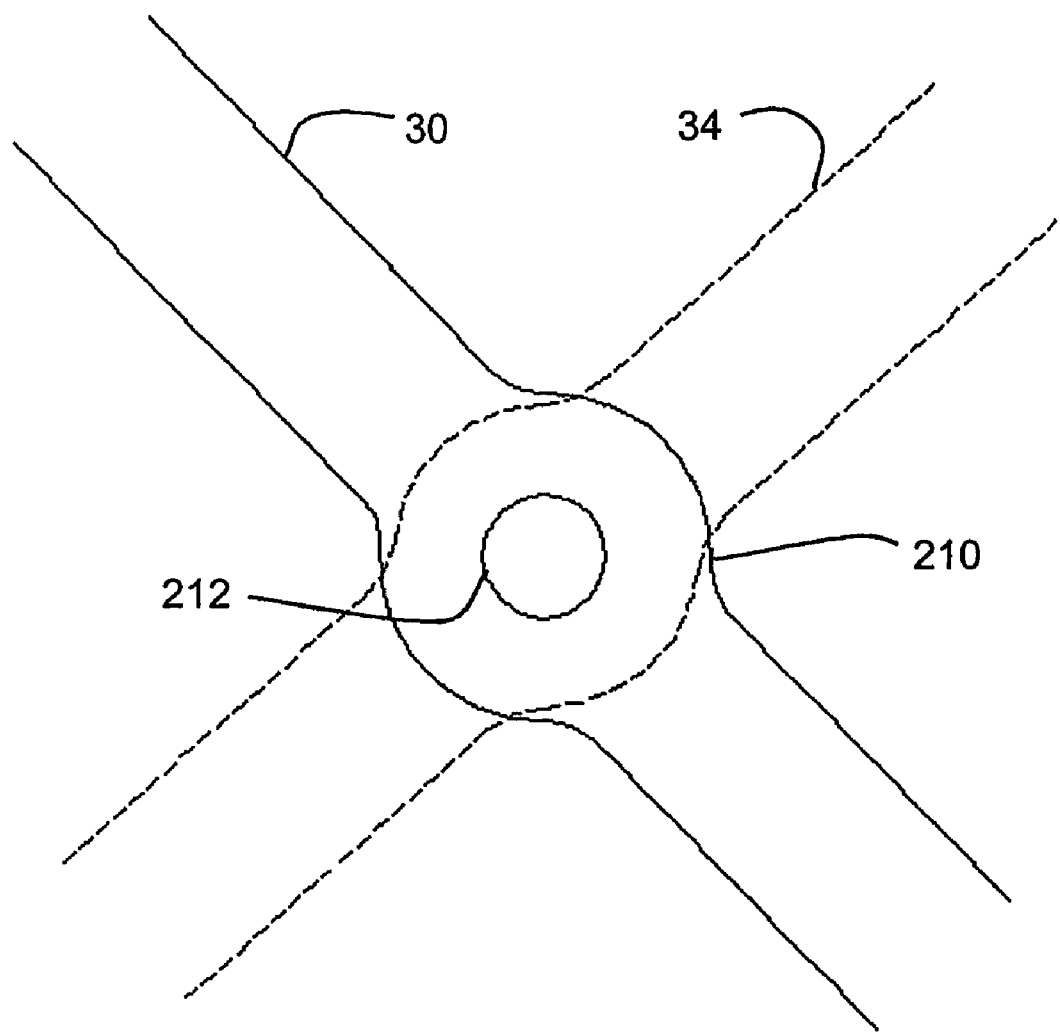

The apparatus 10 can be configured to provide other means for facilitating connection to the resulting structure. For example, referring to FIG. 11*e*, a node 210 can be formed with an aperture or bore 212 therein. Such a bore 212 in the resulting structure can receive a bolt or the like to secure another object to the structure. The bore 212 can be formed by wrapping the fibers or helical and reverse helical components 30 and 34 around a peg or rod. Such a peg or rod can be part of the engagement member 84. For example, the engagement member 84 can include a hook about which the components 30 and 34 are wrapped. The hook itself can form the resulting bore. Alternatively, a separate peg or rod can be used. The peg or rod can be threaded to form a threaded bore.

Figure 12A:
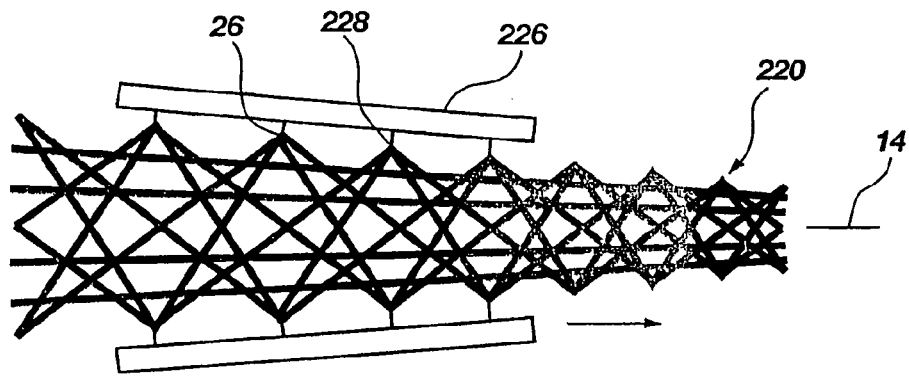
FIGS. 12a and b are side views of tapering structures fabricated in accordance with the present invention.
Figure 12B:
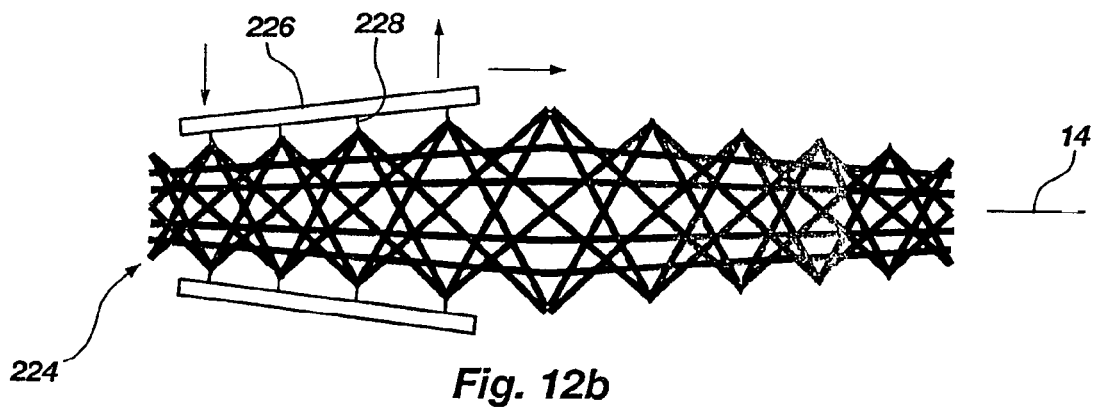

In addition, the subject method and apparatus can be configured to form structures with a taper. Referring to FIGS. 12a and 12b, tapering structures 220 and 224 are shown which taper in either direction. The tapering structures 220 and 224 can be formed by configuring an intermediate support element 226, and/or engagement members 228, in a tapering configuration. The engagement members 228 can be located closer or further from the axis 14 in order to create the tapering structures 220 and 224. The intermediate support element 228 can move with the structures along the processing path. Both of the structures 220 and 224 can be made sequentially to form a continuous structure.

Figure 13:
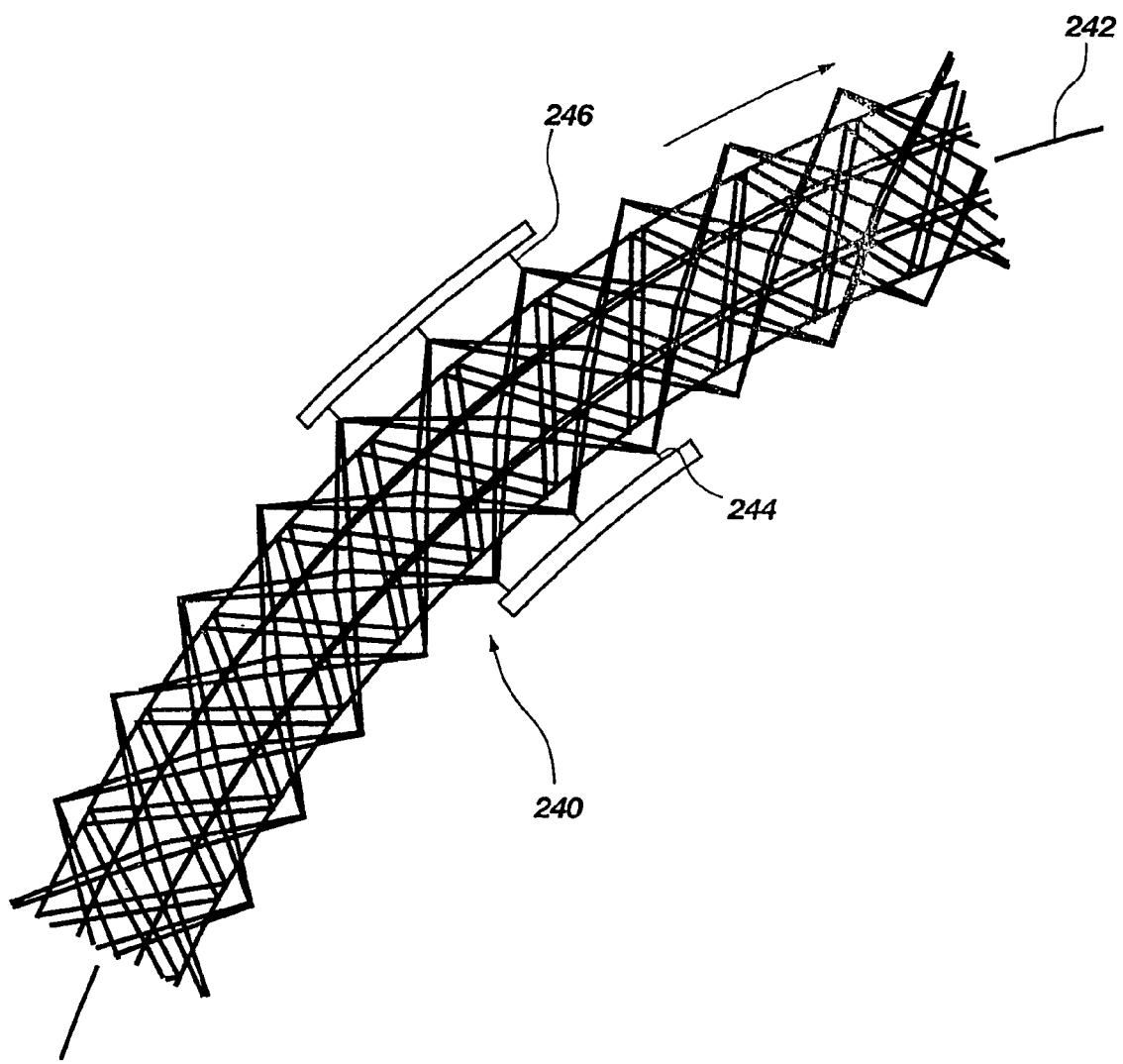
FIG. 13 is a top view of an arcuate structure fabricated in accordance with the present invention.

In addition, the subject method and apparatus can be configured to form a curved structure 240, with an arcuate axis 242, as in FIG. 13. The apparatus can include an arcuate processing path. The engagement members 244 on the inside of the arc can be located closer together, while the engagement members 246 on the outside of the arc can be located further apart from one another. This disparity in fiber positioning can be applied to form parts having a variety of radii.

Figure 14:
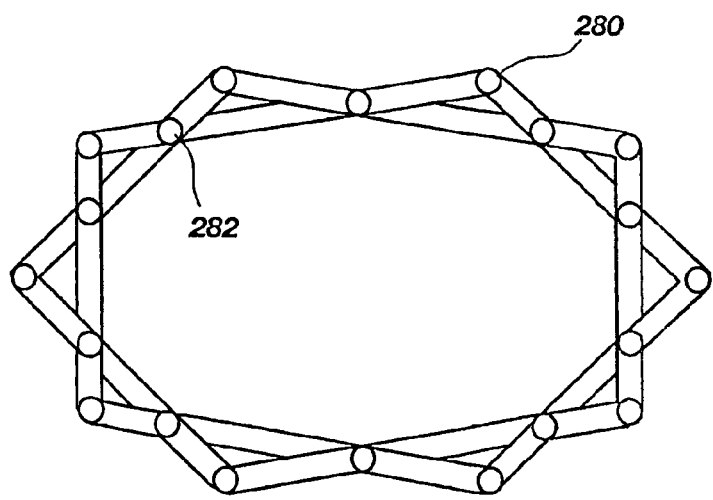
FIG. 14 is an end view of a structure fabricated in accordance with the present invention.

In addition, the apparatus can be configured to form non-symmetrical structures. The engagement members can be configured to achieve the desired configuration of the structure. The engagement members 84 were shown in FIG. 1 as being symmetrically located around the axis 14 to fabricate a symmetrical structure. For example, referring to FIG. 14, the engagement members 280 can be arranged elliptically, or in an elliptical shape, to form a structure 282 with a more elliptical configuration or cross-section. It will be appreciated that other shapes can be formed, such as airfoil shapes, etc.

Figure 15:
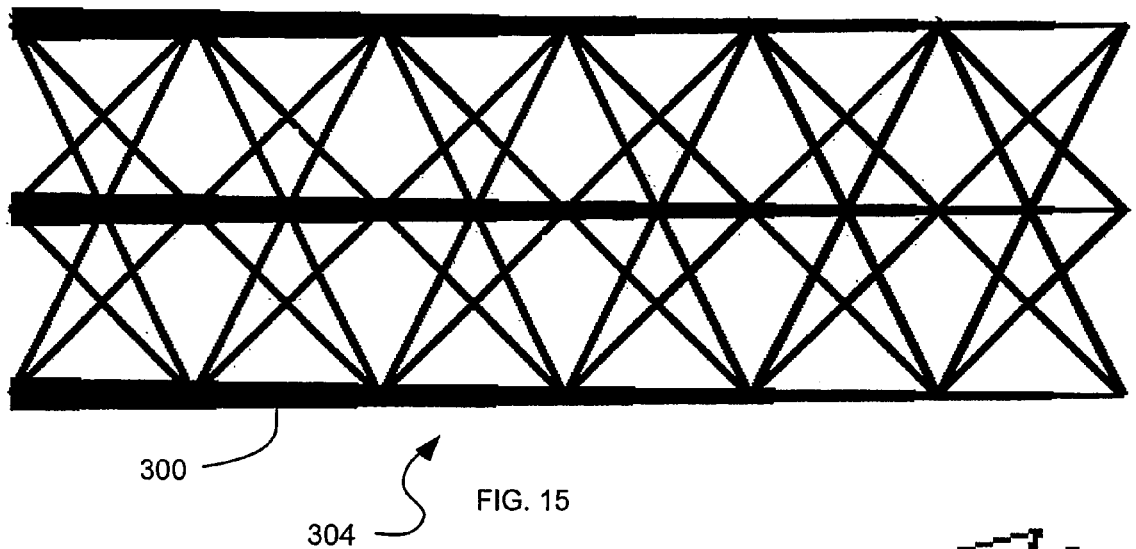
FIG. 15 is a side view of a structure fabricated in accordance with the present invention.
Figure 16A:
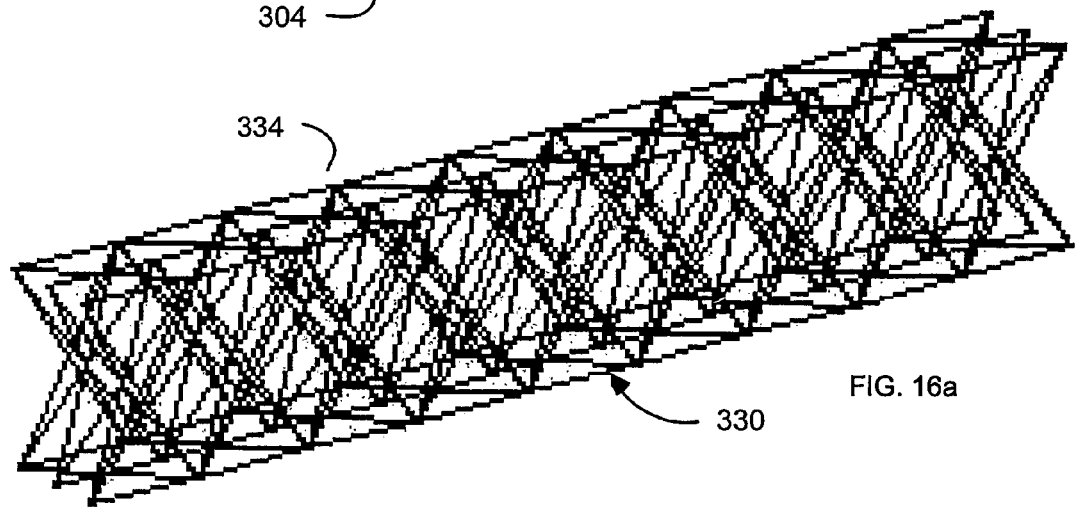
FIG. 16a is a perspective view of a rectangular structure fabricated in accordance with the present invention.
Figure 16B:
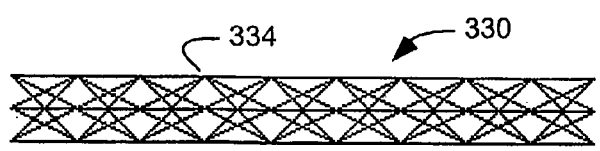
Figure 16D:
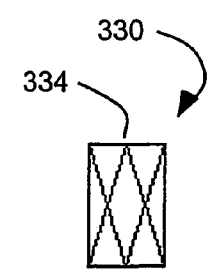
Figure 16C:
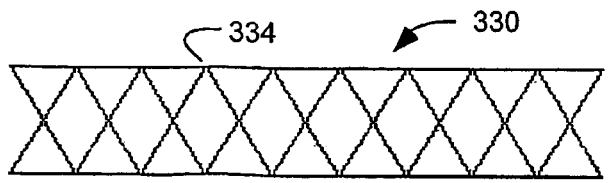

In another aspect, the subject method and apparatus can be configured to form tapered components, such as tapered external members 300 that taper along their length, as shown in FIG. 15. Such a structure 304 can be formed with tapered strands 300 that are thicker and stronger at one end or portion of the structure, and thinner and lighter at another end or portion. The fiber feed sources can be configured to increase or reduce the number of fibers in the strand or tow to form the taper.

In another aspect, the subject method and apparatus can be configured to form a structure 330 with a square or rectangular cross-section, as shown in FIGS. 16a–d. The structure 330 includes six external nodes 334 configured to form the square cross-section. For example, the external support frame and/or engagement members can be positioned with three sets of engagement members at the top of the structure, and three sets at the bottom.

Figure 17A:
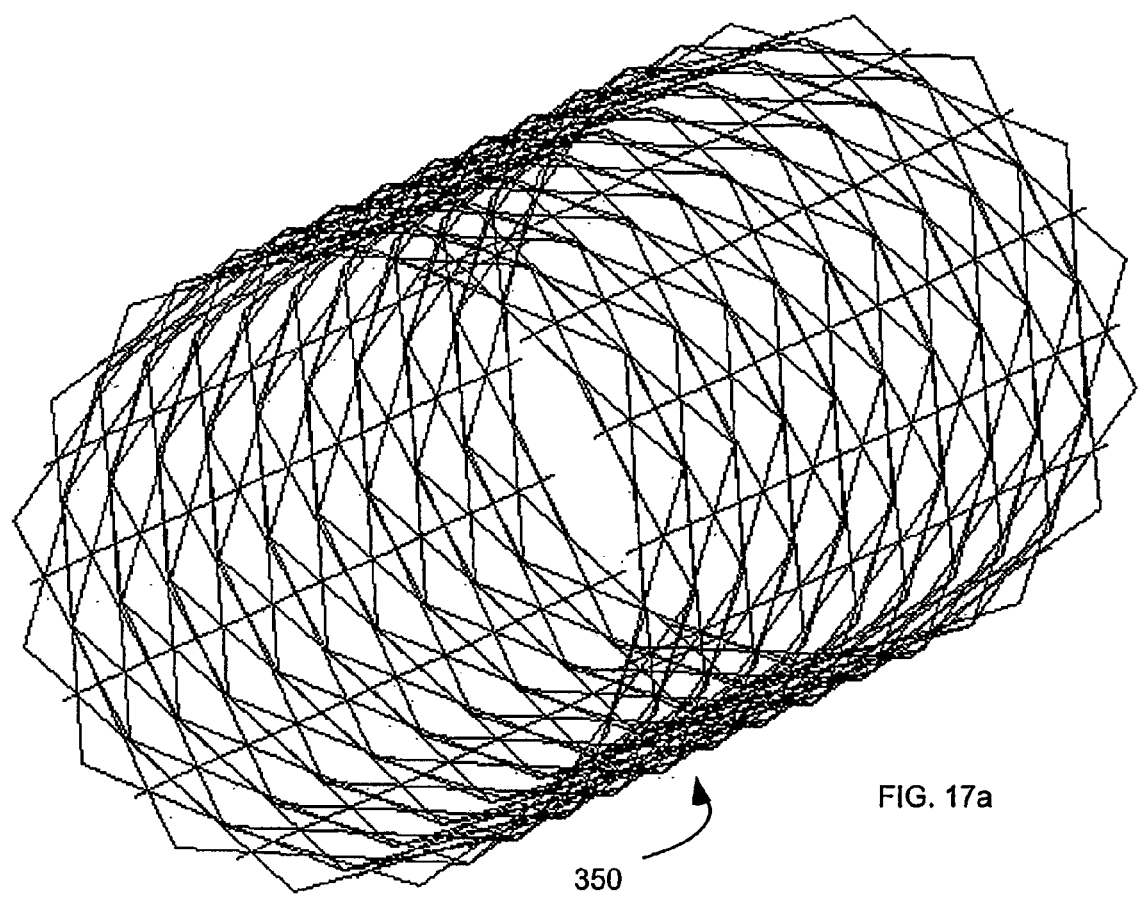
FIG. 17a is a perspective view of a structure fabricated in accordance with the present invention.
Figure 17B:
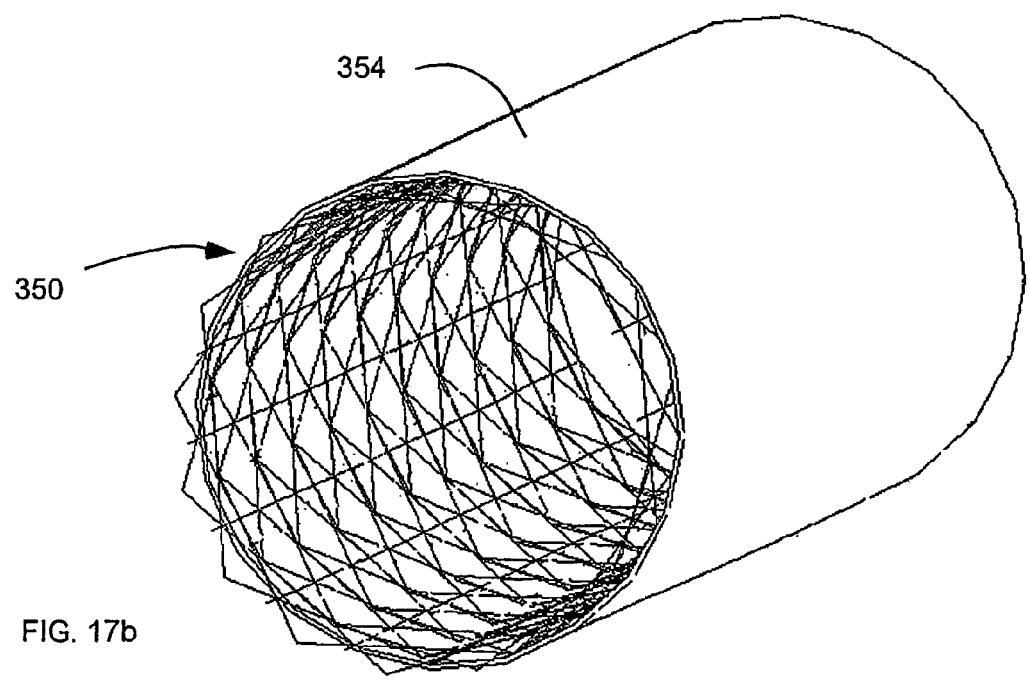
FIG. 17b is a perspective view of the structure of FIG. 17a, shown with a skin or shell.

In another aspect, the subject method and apparatus can be configured to form a multi-node structure 350, as shown in FIGS. 17a and b, that begins to resemble a circle or tube that can include an exterior skin, shell or grid 354.

Referring again to FIGS. 1–5d, the tensioned fiber placement or casting method for fabricating complex, three-dimensional structures from composite fiber/resin is shown using the apparatus 10. A plurality of continuous fibers is pulled through and along a processing path with a longitudinal axis. The fibers can be pulled from one or more feed sources. As described above, the fibers can be pulled by a puller that engages the fibers and advances them through the preprocessing configuration and processing stage, and into the final cured structure.

At least some of the fibers are wound around the longitudinal axis in opposite directions to form 1) helical components, and 2) reverse helical components, that intersect at nodes. In addition, some of the fibers can be wound around the longitudinal axis in opposite directions and different orientations to form 3) rotated helical components, and 4) rotated reverse helical components. As described above, the fiber sources can be rotated around the axis and along the paths with variable lengths and changing orientations.

The plurality of continuous fibers is arranged into a skeleton structure having a desired configuration for realizing a predetermined structure. The skeleton includes: 1) continuous straight strands oriented along the processing path and spaced apart from the longitudinal axis; 2) helical strands with sequential discrete or straight segments wrapping around the longitudinal axis in one direction; and 3) reverse helical strands with sequential discrete or straight segments wrapping around the longitudinal axis in another opposite direction, with the helical and reverse helical strands intersecting at nodes. The skeleton can also include rotated helical components, and rotated reverse helical components.

The helical and reverse helical components can be directed or forced radially outwardly from the longitudinal axis at the nodes to form the sequential discrete or straight segments in the helical and reverse helical components.

Select nodes are engaged and positioned, such as by engagement members of an intermediate support element, to maintain the straight segments in correct orientations. The select nodes are directed radially outwardly from the longitudinal axis to create sequential straight segments in the helical and reverse helical components (and the rotated helical and rotated reverse helical components) with the nodes being at a greater distance from the longitudinal axis than the remaining segments. In one aspect, the nodes are engaged and maintained from outside the helical and reverse helical components.

The skeleton is simultaneously pulled along the processing path while the continuous fibers are arranged, woven, laced, braided, covered, displaced to nodal positions, stabilized, and cured. These operations are sequentially or concurrently applied as the skeleton advances along the processing path. Resin is applied to the continuous fibers prior to or during the preprocessing configuration to thoroughly wet all of the fibers. As described above, the resin can by applied by applicators, such as spray nozzles. The resin is cured, such as by ovens or other devices as described above.

In addition, the plurality of continuous fibers can be arranged to form a plurality of elongated strands in a predetermined orientation, including at least two different strands with different orientations that intersect one another at a node. The plurality of fibers is overlapped at the node, often forming gaps between the plurality of fibers. Accordingly, the plurality of fibers in each strand is consolidated together to compact the fibers together and reduce the gaps. The step of consolidating the fibers in each strand together can include twisting the strand, wrapping other fibers around the strand to form a core of substantially unidirectional fibers wrapped with a layer of outer fibers, braiding the strands together, and/or braiding outer fibers around straight or twisted inner fibers.

In addition, fibers or tows can be begun or terminated within each component, member or strand to reduce or increase the number of strands along the length thereof, or along the length of the structure. Thus, the diameter or size of a strand, component or member can increase or decrease along its length, or the length of the structure. It will be appreciated that the number of fibers affects the strength of the structure. It also will be appreciated that some applications require differing strengths along the length of the structure. For example, for a utility pole, greater load bearing capability can be required at the base, while less load bearing capability may be required at the top.

The apparatus or process can be started with a first, greater plurality of fibers, and reduce or discontinue the number of fibers or tows as the process continues. For example, each fiber feed source can include a plurality of fiber feed sources, or can provide a plurality of fibers. Select fiber feed sources within the plurality of fiber feed sources forming a strand or component can be terminated, or the fibers or tows cut, to reduce the number of fibers or tows in the strand or component. Thus, the strand or component can have a greater number of fibers or tows at one end, and thus greater load bearing capability, and have a lesser number of fibers or tows at another end, and thus lesser load bearing capability. Alternatively, the apparatus or process can be started with a second, lesser plurality of fibers, and increase or add fibers or tows as the process continues.

Referring to FIG. 4c, it can be desirable to integrally form the truss structure 12 with a different configuration. Such different configuration can facilitate connecting the end of the structure to another object. For example, the structure 12 can be integrally formed with an end 300 having tubular or cylindrical cross-sectional shape. The apparatus 10 can include a mandrel, as is known in the art, which can be inserted into the apparatus 10 to form such different configurations. For example, a mandrel with a circular cross-sectional shape can be inserted into the apparatus 10. The fibers 50 from the fiber feed sources can be wrapped around the mandrel to form the end 300 with the tubular or cylindrical cross-sectional shape. The operation of the intermediate support member 80 and/or engagement members 84 may be suspended while the mandrel is in the apparatus 10 so that the fibers can be wrapped around the mandrel. It is of course understood that other shapes can be formed at the end.

Figure 4D:
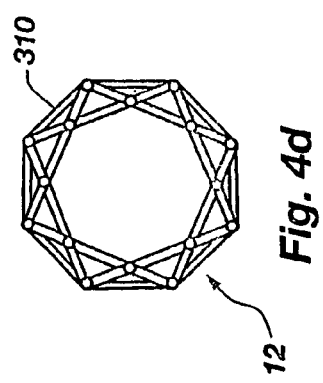
FIG. 4d is an end view of the exemplary structure of FIG. 4a with an exterior skin, shell or grid.
Figure 4E:
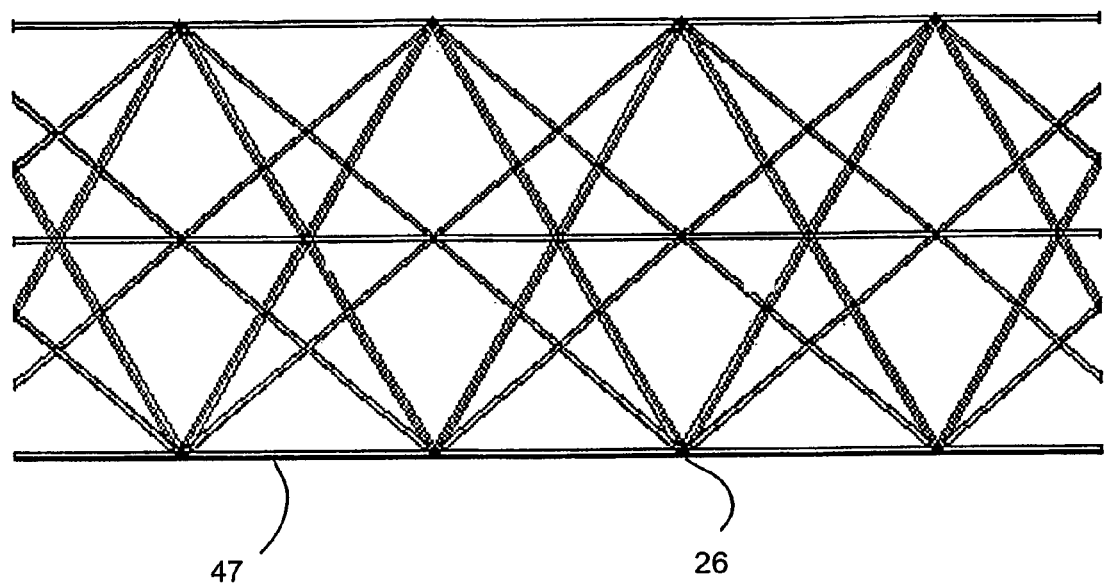
FIG. 4e is a side view of an exemplary structure to be fabricated with the apparatus of FIG. 1.
Figure 4F:
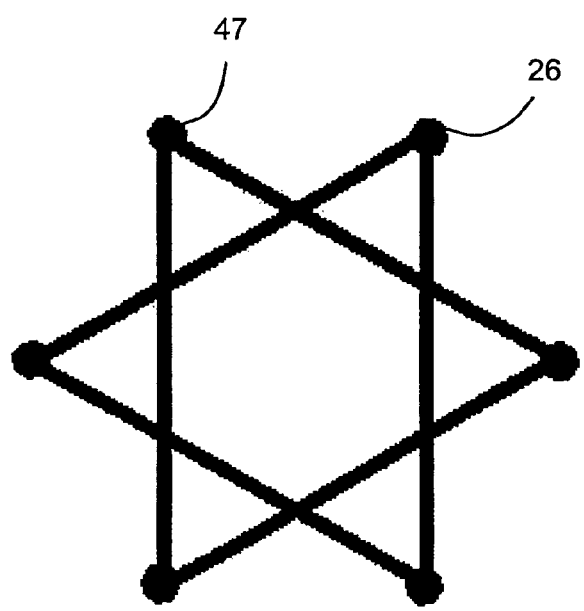
FIG. 4f is an end view of the exemplary structure of FIG. 4e.

Referring to FIG. 4d, it can be desirable to form the truss structure 12 with an exterior skin, shell or grid 310. The skin or shell can close the structure 12. The skin or shell also can be formed of composite fiber/resin. The apparatus 10 can wrap a plurality of fibers around the truss structure 12 in a continuous layer. The apparatus 10 can wrap the structure 12 in a second stage, after the structure has been formed, due to the intermediate support member 80 and/or engagement member 84 being disposed about the exterior of the structure. Alternatively, the apparatus 10 can wrap the structure 12 while the structure is being formed, such as when the intermediate support member and/or engagement members disposed in the interior of the structure.

As stated above, the fibers preferably are continuous, and can be carbon, glass, basalt, aramid, or other fibers. The resin can be any type, such as a thermoplastic resin, like PCV, or thermoset resin, like epoxy or vinyl ester.

As stated above, the tensioned fiber casting method and apparatus can be configured for any type of structure by tensioning fibers into a skeletal, open structure. In addition, the method and apparatus described above also can be used to fabricate greneral polygonal cross-section stiffened structures, such as isogrid structures.

It is to be understood that the above-referenced arrangements are illustrative of the application for the principles of the present invention. Numerous modifications and alternative arrangements can be devised without departing from the spirit and scope of the present invention while the present invention has been shown in the drawings and described above in connection with the exemplary embodiments(s) of the invention. It will be apparent to those of ordinary skill in the art that numerous modifications can be made without departing from the principles and concepts of the invention as set forth in the claims.

What is claimed is:

1. A method for fabricating a complex, three-dimensional structure from composite fiber/resin, comprising the steps of:
   a) pulling a plurality of continuous fibers from a feed source along a processing path about a longitudinal axis;
   b) winding at least some of the fibers around the longitudinal axis in opposite directions to form helical and reverse helical components that intersect at nodes;
   c) engaging the fibers in the processing path substantially only at locations localized at select nodes without substantially engaging the helical and reverse helical components;
   d) maintaining the select nodes radially outwardly from the longitudinal axis to create sequential discrete segments in the helical and reverse helical components forming a skeleton structure;
   e) simultaneously pulling the skeleton structure along the processing path while forming the skeleton structure;
   f) applying a resin to the fibers; and
   g) curing the resin.

2. A method in accordance with claim 1, wherein the step of engaging the select nodes further includes engaging the select nodes from outside the helical and reverse helical components; and wherein the step of maintaining the select nodes further includes maintaining the select nodes radially outwardly by a force originating from outside the helical and reverse helical components.

3. A method in accordance with claim 1, wherein the step of maintaining further includes the step of displacing the select nodes radially outwardly from the longitudinal axis.

4. A method in accordance with claim 1, wherein the step of maintaining further includes maintaining the fibers in a desired configuration without using an internal mandrel disposed inside an interior space defined by the helical and reverse helical components.

5. A method in accordance with claim 1, further comprising the step of:
   arranging a plurality of continuous fibers into a skeleton structure having a desired configuration, including at least:
   1) continuous straight strands oriented along the processing path and spaced apart from the longitudinal axis;
   2) helical strands with sequential discrete segments wrapping around the longitudinal axis in one direction; and
   3) reverse helical strands with sequential discrete segments wrapping around the longitudinal axis in another opposite direction, with the helical and reverse helical strands intersecting at nodes.

6. A method in accordance with claim 1, further comprising the step of:
   a) guiding the plurality of continuous fibers along the processing path and around the longitudinal axis in opposite directions to form:
   1) at least two, spaced apart, helical components each having a common angular orientation about the longitudinal axis, and 2) at least one reverse helical component, attached to the at least two helical components having an opposing angular orientation with respect to the two helical components; and wherein engaging and maintaining the nodes forms at least three elongate, discrete segments sequentially connected end to end in a helical configuration forming a single, substantially complete rotation about the longitudinal axis.

7. A method in accordance with claim 1, further comprising the step of:
   a) guiding other of the plurality of continuous fibers along the processing path and the longitudinal axis substantially parallel with the longitudinal axis to form longitudinal components; and
   b) intersecting the helical, reverse helical, and longitudinal components at internal nodes.

8. A method in accordance with claim 1, further comprising the step of:
   a) guiding other of the plurality of continuous fibers along the processing path and the longitudinal axis substantially parallel with the longitudinal axis to form longitudinal components; and
   b) intersecting the helical, reverse helical, and longitudinal components at external nodes.

9. A method in accordance with claim 1, further comprising the step of:
   a) arranging a plurality of continuous fibers to form a plurality of elongated strands in a predetermined orientation including at least two different strands with different orientations that intersect one another at at least one of the nodes;
   b) overlapping the plurality of fibers at the node; and
   c) consolidating the plurality of fibers in each strand together.

10. A method in accordance with claim 9, wherein the step of overlapping the plurality of fibers at the nodes includes forming gaps between the plurality of fibers; and wherein the step of consolidating the plurality of fibers includes compacting the fibers together and reducing the gaps.

11. A method in accordance with claim 9, wherein the step of consolidating the fibers in each strand together includes twisting at least one of the strands.

12. A method in accordance with claim 9, wherein the step of consolidating the fibers in each strand together includes:
   wrapping other fibers around at least one of the strands to form a core of substantially unidirectional fibers wrapped with a layer of outer fibers.

13. A method in accordance with claim 9, wherein the step of consolidating the fibers in each strand together includes braiding at least one of the strands.

14. A method in accordance with claim 9, wherein the step of consolidating the fibers in each strand together includes:
   braiding other fibers around at least one of the strands to form a core of substantially unidirectional fibers wrapped with a layer of outer braided fibers.

15. A method for fabricating a complex, three-dimensional structure from composite fiber/resin, comprising the steps of:
   a) pulling a plurality of continuous fibers from a feed source along a processing path about a longitudinal axis;
   b) winding at least some of the fibers around the longitudinal axis in opposite directions to form helical and reverse helical components that intersect at nodes;
   c) engaging the fibers in the processing path substantially only at locations localized at select nodes from outside the helical and reverse helical components and without substantially engaging the helical and reverse helical components;
   d) maintaining the select nodes radially outwardly from the longitudinal axis by a force originating from outside the helical and reverse helical components to create sequential discrete segments in the helical and reverse helical components;
   e) applying a resin to the fibers; and
   f) curing the resin.

16. A method in accordance with claim 15, wherein the step of maintaining further includes the step of displacing the select nodes radially outwardly from the longitudinal axis.

17. A method in accordance with claim 15, wherein the step of maintaining further includes maintaining the fibers in a desired configuration without using an internal mandrel disposed inside an interior space defined by the helical and reverse helical components.

18. A method in accordance with claim 15, further comprising the step of:
   arranging a plurality of continuous fibers into a skeleton structure having a desired configuration, including at least:
   1) continuous straight strands oriented along the processing path and spaced apart from the longitudinal axis;
   2) helical strands with sequential discrete segments wrapping around the longitudinal axis in one direction; and
   3) reverse helical strands with sequential discrete segments wrapping around the longitudinal axis in another opposite direction, with the helical and reverse helical strands intersecting at nodes.

19. A method in accordance with claim 15, further comprising the step of:
   a) guiding the plurality of continuous fibers along the processing path and around the longitudinal axis in opposite directions to form:
   1) at least two, spaced apart, helical components each having a common angular orientation about the longitudinal axis, and
   2) at least one reverse helical component, attached to the at least two helical components having an opposing angular orientation with respect to the two helical components; and wherein engaging and maintaining the nodes forms at least three elongate, discrete segments sequentially connected end to end in a helical configuration forming a single, substantially complete rotation about the longitudinal axis.

20. A method in accordance with claim 15, further comprising the step of arranging a plurality of continuous fibers into a skeleton structure having a desired configuration.

21. A method in accordance with claim 20, further comprising the step of simultaneously pulling the skeleton structure along the processing path while arranging the continuous fibers.

22. A method in accordance with claim 15, further comprising the step of:
   a) guiding other of the plurality of continuous fibers along the processing path and the longitudinal axis substantially parallel with the longitudinal axis to form longitudinal components; and
   b) intersecting the helical, reverse helical, and longitudinal components at internal nodes.

23. A method in accordance with claim 15, further comprising the step of:

a) guiding other of the plurality of continuous fibers along the processing path and the longitudinal axis substantially parallel with the longitudinal axis to form longitudinal components; and
b) intersecting the helical, reverse helical, and longitudinal components at external nodes.

24. A method in accordance with claim 15, further comprising the step of:
a) arranging a plurality of continuous fibers to form a plurality of elongated strands in a predetermined orientation including at least two different strands with different orientations that intersect one another at at least one of the nodes;
b) overlapping the plurality of fibers at the node; and
c) consolidating the plurality of fibers in each strand together.

25. A method in accordance with claim 24, wherein the step of overlapping the plurality of fibers at the nodes includes forming gaps between the plurality of fibers; and wherein the step of consolidating the plurality of fibers includes compacting the fibers together and reducing the gaps.

26. A method in accordance with claim 24, wherein the step of consolidating the fibers in each strand together includes twisting at least one of the strands.

27. A method in accordance with claim 24, wherein the step of consolidating the fibers in each strand together includes:
wrapping other fibers around at least one of the strands to form a core of substantially unidirectional fibers wrapped with a layer of outer fibers.

28. A method in accordance with claim 24, wherein the step of consolidating the fibers in each strand together includes braiding at least one of the strands.

29. A method in accordance with claim 24, wherein the step of consolidating the fibers in each strand together includes:
braiding other fibers around at least one of the strands to form a core of substantially unidirectional fibers wrapped with a layer of outer braided fibers.

30. A method for fabricating a complex, three-dimensional structure from composite fiber/resin, comprising the steps of:
a) pulling a plurality of continuous fibers from a feed source along a processing path about a longitudinal axis;
b) winding at least some of the fibers around the longitudinal axis in opposite directions to form helical and reverse helical components that intersect at nodes;
c) engaging the fibers in the processing path substantially only at locations localized at select nodes without substantially engaging the helical and reverse helical components;
d) maintaining the select nodes radially outwardly from the longitudinal axis to create sequential discrete segments in the helical and reverse helical components;
e) displacing the select nodes radially outwardly from the longitudinal axis;
f) applying a resin to the fibers; and
g) curing the resin.

31. A method for fabricating a complex, three-dimensional structure from composite fiber/resin, comprising the steps of:
a) pulling a plurality of continuous fibers from a feed source along a processing path about a longitudinal axis;
b) winding at least some of the fibers around the longitudinal axis in opposite directions to form helical and reverse helical components that intersect at nodes;
c) engaging the fibers in the processing path substantially only at locations localized at select nodes without substantially engaging the helical and reverse helical components;
d) maintaining the select nodes radially outwardly from the longitudinal axis to create sequential discrete segments in the helical and reverse helical components, and maintaining the fibers in a desired configuration without using an internal mandrel disposed inside an interior space defined by the helical and reverse helical components;
e) applying a resin to the fibers; and
f) curing the resin.

32. A method for fabricating a complex, three-dimensional structure from composite fiber/resin, comprising the steps of:
a) arranging a plurality of continuous fibers into a skeleton structure having a desired configuration by:
i) pulling the plurality of continuous fibers from a feed source along a processing path about a longitudinal axis;
ii) winding at least some of the fibers around the longitudinal axis in opposite directions to form helical and reverse helical components that intersect at nodes;
iii) engaging the fibers in the processing path substantially only at locations localized at select nodes without substantially engaging the helical and reverse helical components; and
iv) maintaining the select nodes radially outwardly from the longitudinal axis to create sequential discrete segments in the helical and reverse helical components;
b) simultaneously pulling the skeleton structure along the processing path while arranging the continuous fibers;
c) applying a resin to the fibers; and
d) curing the resin.

* * * * *